United States Patent
Zhang et al.

(10) Patent No.: US 9,203,683 B2
(45) Date of Patent: Dec. 1, 2015

(54) DATA UNIT FORMAT FOR SINGLE USER BEAMFORMING IN LONG-RANGE WIRELESS LOCAL AREA NETWORKS (WLANS)

(71) Applicant: MARVELL WORLD TRADE LTD., St. Michael (BB)

(72) Inventors: Hongyuan Zhang, Fremont, CA (US); Raja Banerjea, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 158 days.

(21) Appl. No.: 13/741,077

(22) Filed: Jan. 14, 2013

(65) Prior Publication Data
US 2013/0182593 A1 Jul. 18, 2013

Related U.S. Application Data

(60) Provisional application No. 61/586,565, filed on Jan. 13, 2012, provisional application No. 61/587,386, filed on Jan. 17, 2012, provisional application No. 61/591,718, filed on Jan. 27, 2012, provisional application No. 61/610,725, filed on Mar. 14, 2012, provisional application No. 61/674,724, filed on Jul. 23, 2012.

(51) Int. Cl.
*H04W 84/12* (2009.01)
*H04L 29/02* (2006.01)
(Continued)

(52) U.S. Cl.
CPC ............. *H04L 29/02* (2013.01); *H04L 5/0023* (2013.01); *H04L 27/2613* (2013.01); *H04W 84/12* (2013.01)

(58) Field of Classification Search
USPC .......... 370/329, 311, 328, 338, 465; 375/295, 375/310
See application file for complete search history.

(56) References Cited

U.S. PATENT DOCUMENTS

| 7,599,332 B2 | 10/2009 | Zelst et al. |
| 7,742,390 B2 | 6/2010 | Mujtaba |

(Continued)

FOREIGN PATENT DOCUMENTS

| EP | 2518929 A2 | 10/2012 |
| WO | WO-2009/059229 A1 | 5/2009 |

(Continued)

OTHER PUBLICATIONS

Park, "Proposed Specification Framework for TGah", *The Institute of Electrical and Electronics Engineers*, doc. No. IEEE 802.11-11/1137r11, (Sep. 2012).

(Continued)

*Primary Examiner* — Awet Haile

(57) ABSTRACT

A method includes receiving data units each having a preamble with first and second preamble portions, detecting symbol constellation rotations of OFDM symbols in the first preamble portions, and determining, based on the detected rotations, whether the preambles conform to a first format. The method also includes, when it is determined that a preamble conforms to the first format, processing the second preamble portion according to the first format, and, when it is determined that a preamble does not conform to the first format, (i) determining whether information bits in the first preamble portion indicate a single- or multi-user data unit, (ii) when it is determined that the information bits indicate a single-user data unit, processing the second preamble portion according to a second format, and (iii) when it is determined that the information bits indicate a multi-user data unit, processing the second preamble portion according to a third format.

21 Claims, 10 Drawing Sheets

(51) Int. Cl.
*H04L 5/00* (2006.01)
*H04L 27/26* (2006.01)

(56) References Cited

U.S. PATENT DOCUMENTS

| | | | |
|---|---|---|---|
| 8,144,647 B2 | 3/2012 | Nabar et al. | |
| 8,331,419 B2 | 12/2012 | Zhang et al. | |
| 8,527,853 B2 | 9/2013 | Lakkis | |
| 8,619,907 B2 | 12/2013 | Mujtaba et al. | |
| 8,826,106 B2 | 9/2014 | Zhang et al. | |
| 8,982,889 B2 | 3/2015 | Zhang | |
| 2006/0193340 A1 | 8/2006 | Jones et al. | |
| 2008/0298435 A1 | 12/2008 | Lakkis | |
| 2009/0196163 A1 | 8/2009 | Du | |
| 2010/0046358 A1 | 2/2010 | van Nee | |
| 2010/0091675 A1 | 4/2010 | Sawai | |
| 2010/0260159 A1* | 10/2010 | Zhang et al. | 370/338 |
| 2010/0290449 A1 | 11/2010 | van Nee et al. | |
| 2010/0309834 A1 | 12/2010 | Fischer et al. | |
| 2011/0002219 A1 | 1/2011 | Kim et al. | |
| 2011/0026623 A1 | 2/2011 | Srinivasa et al. | |
| 2011/0032875 A1 | 2/2011 | Erceg et al. | |
| 2011/0255620 A1 | 10/2011 | Jones, IV et al. | |
| 2012/0195391 A1 | 8/2012 | Zhang et al. | |
| 2012/0201316 A1 | 8/2012 | Zhang et al. | |
| 2012/0294294 A1 | 11/2012 | Zhang | |
| 2012/0300874 A1 | 11/2012 | Zhang | |
| 2012/0314802 A1 | 12/2012 | Oh et al. | |
| 2012/0324315 A1 | 12/2012 | Zhang et al. | |
| 2013/0107990 A1 | 5/2013 | Zhang et al. | |
| 2013/0142095 A1* | 6/2013 | Calcev et al. | 370/311 |
| 2013/0155976 A1* | 6/2013 | Chen et al. | 370/329 |
| 2013/0182662 A1 | 7/2013 | Zhang et al. | |
| 2013/0202001 A1 | 8/2013 | Zhang | |

FOREIGN PATENT DOCUMENTS

| | | |
|---|---|---|
| WO | WO-2011/031058 A2 | 3/2011 |
| WO | WO-2011/130473 A1 | 10/2011 |
| WO | WO-2012/122119 A1 | 9/2012 |

OTHER PUBLICATIONS

International Search Report and Written Opinion in corresponding PCT/IB2013/000577 dated Jun. 28, 2013.
IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).
de Vegt, "Potential Compromise for 802.11ah Use Case Document", Institute of Electrical and Electronics Engineers, doc. No. IEEE 802.11-11/0457r0, pp. 1-27 (Mar. 2011).
Park, "Proposed Specification Framework for TGah", The Institute of Electrical and Electronics Engineers, doc. No. IEEE 802.11-11/1137r6, pp. 1-13 (Mar. 2012).
Park, "Proposed Specification Framework for TGah D9.x", The Institute of Electrical and Electronics Engineers, doc. No. IEEE 802.11-yy/xxxxr0, pp. 1-30 (Jul. 2012).
Park, "Specification Framework for TGah," *The Institute of Electrical and Electronics Engineers*, doc. No. IEEE 802.11-11/1137r13, pp. 1-58, Jan. 14, 2013.
Vermani, et al. "Spec Framework Text for PHY Numerology," The Institute of Electrical and Electronics Engineers, doc. No. IEEE 802.11-11/1311r0, pp. 1-5 (Sep. 2011).
Vermani, et al. "Preamble Format for 1 MHz," The Institute of Electrical and Electronics Engineers, doc. No. IEEE 802.11-11/1482r2, pp. 1-30 (Nov. 2011).
Yu et al., "Coverage extension for IEEE802.11ah," The Institute of Electrical and Electronics Engineers, doc. No. IEEE 802.11-11/0035r1, pp. 1-10 (Jan. 2011).
Zhang et al., "11ah Data Transmission Flow," The Institute of Electrical and Electronics Engineers, doc. No. IEEE 802.11-11/1484r1, pp. 1-15 (Nov. 2011).
Zhang et al., "1 MHz Waveform in Wider BW", The Institute of Electrical and Electronics Engineers, doc. No. IEEE 802.11-12/0309r1, pp. 1-10 (Mar. 2012).
Zhang et al., "Beamforming Feedback for Single Stream," *The Institute of Electrical and Electronics Engineers*, doc. No. IEEE 802.11-12/1312r0, pp. 1-22, Nov. 12, 2012.
International Preliminary Report on Patentability in corresponding PCT/IB2013/000577, 8 pages (Jul. 15, 2014).
IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Mar. 2012.
IEEE Std P802.11ad/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 3: Enhancements for Very High Throughput in the 60 GHz Band," *The Institute of Electrical and Electronics Engineers, Inc.*, Sep. 2011.
IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, Nov. 7, 2001.
IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band,"*The Institute of Electrical and Electronics Engineers, Inc.*, Apr. 2003.
Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).
S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.
"IEEE P802.11nTM/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.
"IEEE Std. 802.11nTM IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.
International Preliminary Report on Patentability in PCT Application No. PCT/US2012/062427 issued Apr. 29, 2014 (7 pages).

(56) References Cited

OTHER PUBLICATIONS

International Search Report and Written Opinion in PCT/US2012/062427 mailed Jan. 25, 2013 (11 pages).
Office Action in U.S. Appl. No. 13/741,094, dated Nov. 21, 2014 (17 pages).
IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).
IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).
IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).
IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).
IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).
IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).
IEEE Std 802.11ad™/D9.0 "Draft Standard for Information technology—Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements for Very High Throughput in the 60 GHz Band *The Institute of Electrical and Electronics Engineers, Inc.*, pp. 1-679 (Jul. 2012).
Chen, "Home Network Basis: Transmission Environments and Wired/Wireless Protocols," *Prentice Hall*, pp. 1-26 (Jul. 2003).
Harada, "Project: IEEE P802.15 Working Group for Wireless Personal Area Network (WPANs)," IEEE 802.15-07-0693-003c, slides 24-33 (May 2007).
Hiertz, et al., "The IEEE 802.11 Universe," *IEEE Communications Magazine*, pp. 62-70, (Jan. 2010).
Park, "Proposed Specification Framework for TGah", *The Institute of Electrical and Electronics Engineers*, doc. No. IEEE 802.11-11/1137r11, pp. 1-36 (Sep. 2012).
Park, "Specification Framework for TGah," *The Institute of Electrical and Electronics Engineers*, doc. No. IEEE 802.11-11/1137r13, pp. 1-58 (Jan. 14, 2013).
Park, "Proposed Specification Framework for TGah", *The Institute of Electrical and Electronics Engineers*, doc. No. IEEE 802.11—yy/xxxxr05, (Jan. 2012).
Perahia, et al., "Gigabit Wireless LANs: an overview of IEEE 802.11ac and 80211ad," ACM SIGMOBILE Mobile Computing and Communications Review, vo. 15, No. 3, pp. 23-33 (Jul. 2011).
Shao, "Channel Selection for 802.11ah," doc.: IEEE 802.11-12/0816r0, pp. 1-11 (Jul. 2012).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
Taghavi et al., "Introductory Submission for TGah", doc. No. IEEE 802.11-11/0062r0, *Institute for Electrical and Electronics Engineers*, pp. 1-5 (Jan. 14, 2011).
van Nee, et al. "The 802.11n MIMO-OFDM Standard for Wireless LAN and Beyond," Wireless Personal Communications, vol. 37, pp. 445-453 (Jun. 2006).
Final Rejection in U.S. Appl. No. 13/741,094, dated Apr. 8, 2015 (11 pages).

* cited by examiner

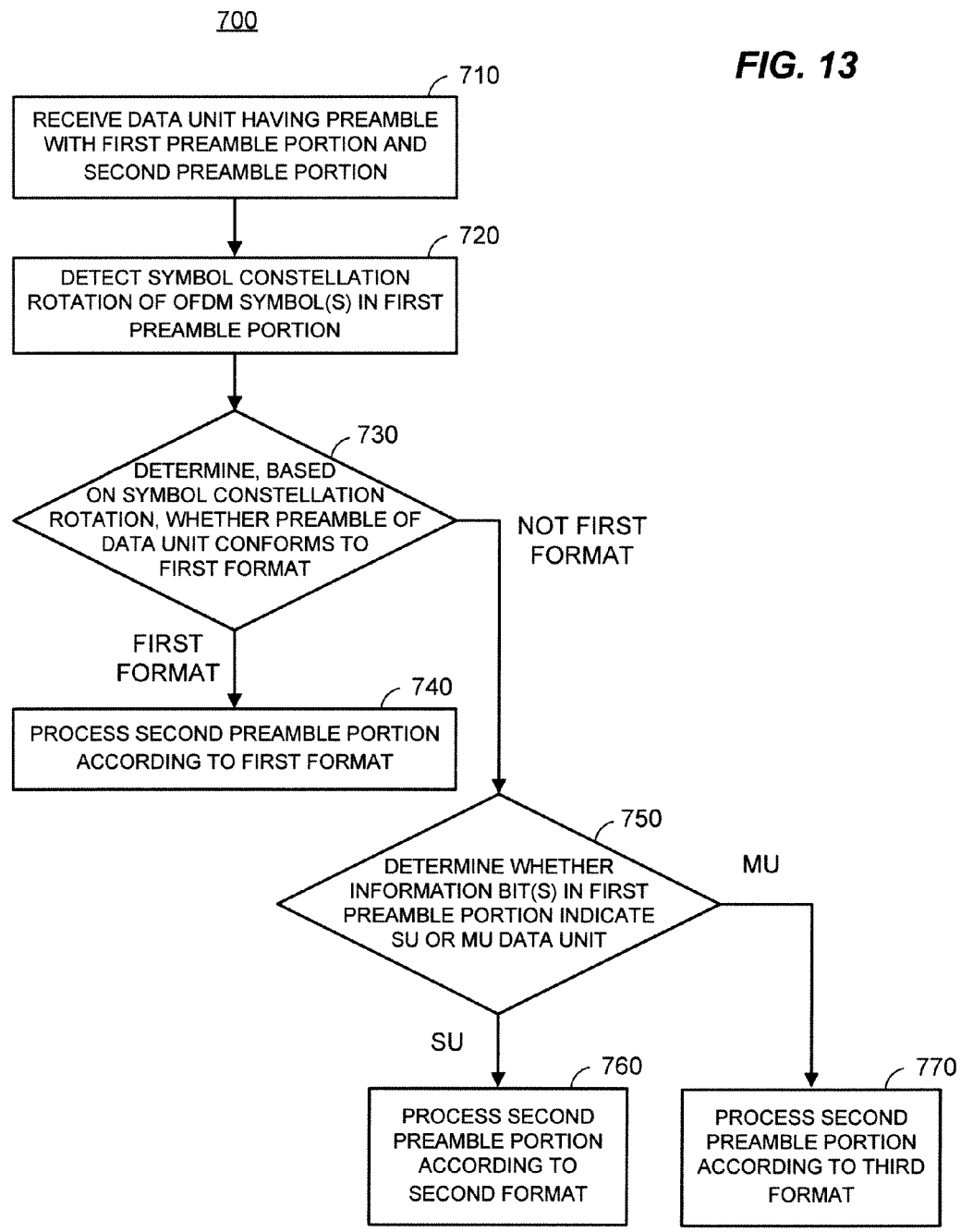

DATA UNIT FORMAT FOR SINGLE USER BEAMFORMING IN LONG-RANGE WIRELESS LOCAL AREA NETWORKS (WLANS)

CROSS-REFERENCES TO RELATED APPLICATIONS

This disclosure claims the benefit of the following U.S. Provisional Patent Applications:

U.S. Provisional Patent Application No. 61/586,565, entitled "Single User Beamforming Format in 11ah," filed on Jan. 13, 2012;

U.S. Provisional Patent Application No. 61/587,386, entitled "Single User Beamforming Format in 11ah," filed on Jan. 17, 2012;

U.S. Provisional Patent Application No. 61/591,718, entitled "Single User Beamforming Format in 11ah," filed on Jan. 27, 2012;

U.S. Provisional Patent Application No. 61/610,725, entitled "Transmit Beamforming with MU-MIMO," filed on Mar. 14, 2012; and U.S. Provisional Patent Application No. 61/674,724, entitled "Single User Beamforming Format in 11ah," filed on Jul. 23, 2012.

The disclosures of all of the above-referenced patent applications are hereby incorporated by reference herein in their entireties.

The present application is related to U.S. patent application Ser. No. 13/741,094, entitled "Data Unit Format for Single User Beamforming in Long-Range Wireless Local Area Networks (WLANs)," filed on the same day as the present application, and hereby incorporated by reference herein in its entirety.

FIELD OF THE DISCLOSURE

The present disclosure relates generally to communication networks and, more particularly, to long-range wireless local area networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range.

Work has begun a new standard, IEEE 802.11ah, which will specify wireless network operation in sub-1 GHz frequencies. Low frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub-1 GHz range that remain unlicensed, with different specific unlicensed frequencies in different geographical regions. The IEEE 802.11ah Standard will specify wireless operation in available unlicensed sub-1 GHz frequency bands.

SUMMARY

In one embodiment, a method includes receiving a plurality of data units each having a preamble. The preamble of each data unit of the plurality of data units includes (i) a first preamble portion, and (ii) a second preamble portion following the first preamble portion. The method also includes detecting a symbol constellation rotation of one or more OFDM symbols in the first preamble portion of each data unit, determining, based on each detected symbol constellation rotation, whether the preamble of the respective data unit conforms to a first format, and, when it is determined that the preamble of the respective data unit conforms to the first format, processing the second preamble portion of the respective data unit according to the first format. The method also includes, when it is determined that the preamble of the respective data unit does not conform to the first format, (i) determining whether one or more information bits in the first preamble portion of the respective data unit indicate a single-user data unit or a multi-user data unit, (ii) when it is determined that the one or more information bits in the first preamble portion of the respective data unit indicate a single-user data unit, processing the second preamble portion of the respective data unit according to a second format different than the first format, and (iii) when it is determined that the one or more information bits in the first preamble portion of the respective data unit indicate a multi-user data unit, processing the second preamble portion of the respective data unit according to a third format different than the first format and the second format.

In another embodiment, an apparatus includes a network interface configured to receive a plurality of data units each having a preamble. The preamble of each data unit of the plurality of data units includes (i) a first preamble portion, and (ii) a second preamble portion following the first preamble portion. The network interface is further configured to detect a symbol constellation rotation of one or more OFDM symbols in the first preamble portion of each data unit, to determine, based on each detected symbol constellation rotation, whether the preamble of the respective data unit conforms to a first format, and, when it is determined that the preamble of the respective data unit conforms to the first format, to process the second preamble portion of the respective data unit according to the first format. The network interface is also configured, when it is determined that the preamble of the respective data unit does not conform to the first format, to (i) determine whether one or more information bits in the first preamble portion of the respective data unit indicate a single-user data unit or a multi-user data unit, (ii) when it is determined that the one or more information bits in the first preamble portion of the respective data unit indicate a single-user data unit, process the second preamble portion of the respective data unit according to a second format different than the first format, and (iii) when it is determined that the one or more information bits in the first preamble portion of the respective data unit indicate a multi-user data unit, process the second preamble portion of the respective data unit according to a third format different than the first format and the second format.

BRIEF DESCRIPTION OF THE DRAWINGS

FIG. 13 is a flow diagram of another example method for receiving and processing a data unit, according to an embodiment.

DETAILED DESCRIPTION

Figure 1:
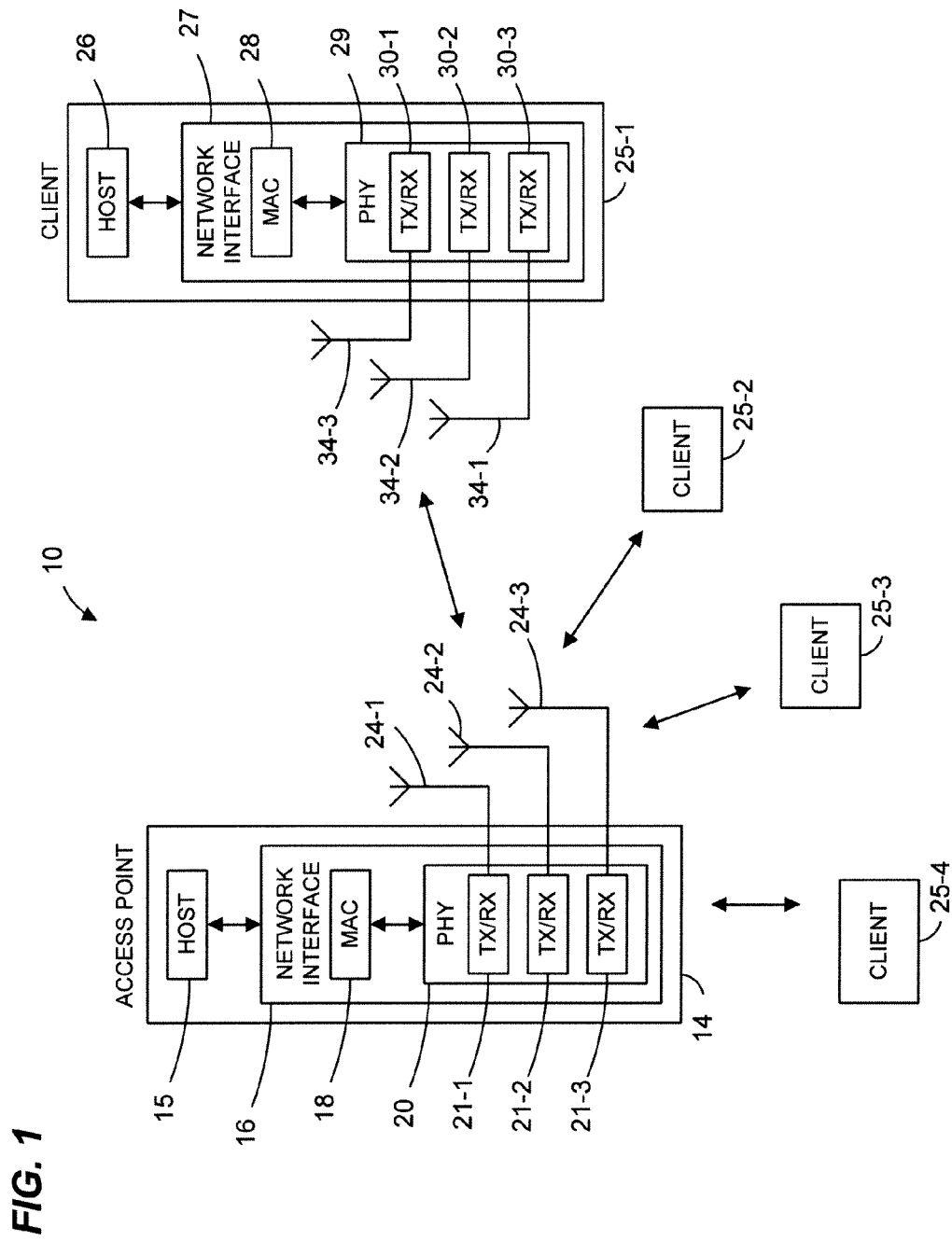
FIG. 1 is a block diagram of an example wireless local area network (WLAN), according to an embodiment.

In embodiments described below, a wireless network device such as an access point (AP) of a wireless local area network (WLAN) transmits data streams to one or more client stations. The AP is configured to operate with client stations according to a communication protocol. In an embodiment, the communication protocol defines operation in a sub-1 GHz frequency range, and is typically used for applications requiring long range wireless communication with relatively low data rates (e.g., IEEE 802.11ah). Example formats of physical layer (PHY) data units of such a protocol, according to various embodiments, are described in U.S. patent application Ser. No. 13/359,336, "Physical Layer Frame Format For Long Range WLAN," the disclosure of which is hereby incorporated by reference herein in its entirety.

In some embodiments, the communication protocol specifies both a first PHY mode (referred to herein as a "normal mode") for larger data rates, and a second PHY mode (referred to herein as a "low rate mode") for lower data rates. A lower data rate mode may be used to further extend the communication range, for example, and generally improves receiver sensitivity (or sensitivity gain). In some embodiments, the low rate mode utilizes not only a lower data rate, but also a lower channel bandwidth, as compared to the normal mode. This reduced-bandwidth PHY mode is referred to herein as "low bandwidth mode." In one example embodiment, low bandwidth mode data units are generated using a 32-point inverse discrete Fourier transform (IDFT) for transmission over a 1 MHz bandwidth, while normal mode data units are generated using a 64-point or larger IDFT for transmission over a 2 MHz or greater bandwidth, where both low bandwidth mode and normal mode data units are generated using the same clock rate. Example formats of low rate mode data units (including low bandwidth mode data units), and the generation of such data units, according to various embodiments, are described in U.S. patent application Ser. No. 13/366,064, "Control Mode PHY for WLAN," and U.S. patent application Ser. No. 13/494,505, "Low Bandwidth PHY for WLAN," the disclosures of which are hereby incorporated by reference herein in their entireties. Low bandwidth mode communications are generally more robust than normal mode communications, having a sensitivity gain that supports extended range communications.

In some embodiments, a transmitting device such as an AP or client station is capable of beamforming transmitted data units. As used herein, the terms "beamforming" and "beamformed" generally refer to transmit-side beamforming (i.e., applying a beamforming steering matrix at the transmitting device) rather than receive-side beamforming. Moreover, in an embodiment, the transmitting device supports both single-user (SU) operation and multi-user, multiple-input multiple-output (MU-MIMO) operation, similar to the SU and MU-MIMO operation as defined under IEEE 802.11ac. For convenience, MU-MIMO operation is referred to herein simply as MU operation. While MU operation inherently utilizes beamforming, SU data units generally may be either beamformed (SU-BF data units) or non-beamformed (i.e., "open loop," or SU-OL data units). In various embodiments, the transmitting device is capable of generating both SU-BF data units and MU data units when in normal mode.

For MU data units, the transmitting device utilizes a preamble format that includes a first, non-beamformed portion intended for all of the multiple users (generally referred to herein as an "omni" portion, although the portion may be transmitted via a directional antenna or antenna array), and a second portion with various fields (e.g., long training fields) that are beamformed using a different beamforming steering matrix for each user. In some embodiments and/or scenarios, the transmitting device utilizes a different, shorter preamble format to transmit SU-BF data units, where the omni portion of the preamble is omitted and an entirety of the preamble is beamformed. By applying beamforming to the entire SU-BF data unit, a receiving device can properly set an automatic gain control (AGC) level based on the first received field of the preamble, for example. Beamforming the entire SU-BF data unit, however, can cause other devices (e.g., devices located in a direction orthogonal to the beamformed transmission) to fail to detect and/or decode any portion of the SU-BF data unit. This can result in the classic "hidden node" problem, in which multiple devices (e.g., client stations) attempt to communicate with another device (e.g., an AP) at the same time, causing interference. Thus, in one embodiment, the transmitting device instead generates SU-BF data units utilizing a longer preamble format with both non-beamformed (omni) and beamformed portions, similar to the MU data unit preamble format. The omni portion allows devices other than the intended recipient of the data unit to detect the SU-BF data unit, and/or to decode information in the SU-BF data unit preamble that indicates a duration of a data portion of the SU-BF data unit, for example.

In some embodiments, one or more orthogonal frequency division multiplexing (OFDM) symbols of the preamble of each data unit is/are modulated using a symbol constellation rotation that indicates whether the longer preamble format (with both omni and beamformed portions) or the shorter preamble format is used for the data unit. Moreover, in some embodiments and scenarios where the longer preamble format is used, the omni portion of the preamble includes a field with information that indicates to a receiving device whether the data unit is an MU data unit or an SU-BF data unit.

FIG. 1 is a block diagram of an example WLAN 10 including an AP 14, according to an embodiment. The AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., one, two, four, five, etc.) of transceivers 21 and antennas 24 in other embodiments.

The WLAN 10 further includes a plurality of client stations 25. Although four client stations 25 are illustrated in FIG. 1, the WLAN 10 can include different numbers (e.g., one, two, three, five, six, etc.) of client stations 25 in various scenarios and embodiments. Each of the client stations 25-1 through 25-4 is configured to operate at least according to a long range communication protocol. In some embodiments, one or more the client stations 25-1 through 25-4 is also configured to operate according to one or more of short range communication protocols.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., one, two, four, five, etc.) of transceivers 30 and antennas 34 in other embodiments.

In some embodiments, one, some, or all of the client stations 25-2, 25-3, and 25-4 has/have a structure the same as or similar to the client station 25-1. In these embodiments, the client stations 25 that are structured the same as or similar to the client station 25-1 have the same or a different number of transceivers and antennas. For example, the client station 25-2 has only two transceivers and two antennas (not shown in FIG. 1), according to an embodiment.

In an embodiment, the PHY processing unit 20 of the AP 14 is configured to generate data units that conform to a long range communication protocol. More specifically, in some embodiments, the PHY processing unit 20 is configured to selectively generate both normal mode and low bandwidth mode data units that conform to the long range communication protocol. The PHY processing unit 20 is further configured to support both SU and MU operation that is similar to the SU and MU operation defined under the IEEE 802.11ac standard, in an embodiment. Thus, in an embodiment, the PHY processing unit 20 is configured to selectively generate both SU data units intended for a single user (e.g., only client station 25-1), and MU data units intended for multiple users (e.g., two or more of client stations 25-1 through 25-4). In an embodiment, MU transmissions use a "Group ID" to indicate which client stations are associated with a particular MU data unit sent by the AP 14, with Group IDs being assigned during group formation.

In some embodiments, the PHY processing unit 20 is configured to generate SU data units when in either normal mode or low bandwidth mode, but can only generate MU data units when in normal mode. In other embodiments, the PHY processing unit 20 is configured to generate SU data units and MU data units both when in normal mode and when in low bandwidth mode. Further, in an embodiment, the PHY processing unit 20 is configured to generate both SU-BF data units and SU-OL data units. In some embodiments, the PHY processing unit 20 is configured to generate SU-OL data units when in either normal mode or low bandwidth mode, but can only generate SU-BF data units when in normal mode. In other embodiments, the PHY processing unit 20 is configured to generate SU-OL and SU-BF data units both when in normal mode and when in low bandwidth mode.

The transceiver(s) 21 of the AP 14 is/are configured to transmit the generated data units via the antenna(s) 24. In various embodiments, the transceiver(s) 21 is/are also configured to receive data units via the antenna(s) 24, and the PHY processing unit 20 of the AP 14 is further configured to process received data units conforming to the long range communication protocol.

In various embodiments, the PHY processing unit 29 of the client station 25-1 is also configured to generate data units, and/or process received data units, conforming to the long range communication protocol. In some embodiments, however, the PHY processing unit 29 is not configured to generate MU data units, and/or is not configured to generate SU-BF data units. The transceiver(s) 30 is/are configured to transmit the generated data units via the antenna(s) 34, and/or receive data units via the antenna(s) 34.

Figure 2:
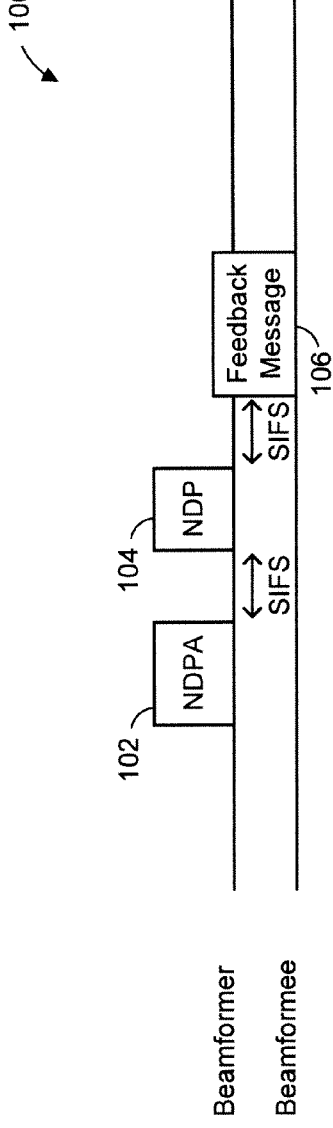
FIG. 2 is a diagram of a prior art sounding technique for single-user beamforming.
Figure 3:
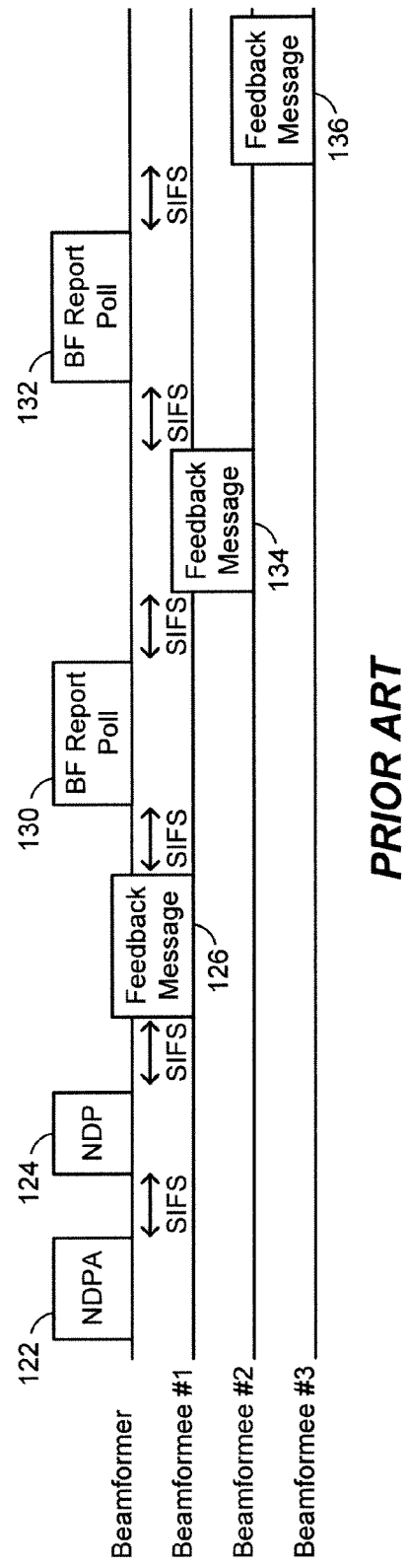
FIG. 3 is a diagram of a prior art sounding technique for multi-user beamforming.

For a device such as the AP 14 to beamform a transmission, some manner of feedback is typically used in order to properly generate a beamforming steering matrix. For example, a transmitting device such as the AP 14 may send a "sounding" packet to a receiving device such as the client station 25-1, and the receiving device may process the sounding packet in order to derive channel information. Coefficients for the steering matrix may then be calculated at the receiving device based on that channel information, and sent back to the transmitting device. FIGS. 2 and 3 show prior art sounding techniques defined by the IEEE 802.11ac standard, which in some embodiments are also utilized by the WLAN 10 of FIG. 1 to support beamforming under the long range communication protocol. In various scenarios and embodiments, for example, the "Beamformer" of FIGS. 2 and 3 is the AP 14 of FIG. 1, the "Beamformee" of FIG. 2 is the client station 25-1 of FIG. 1, and "Beamformees #1-#3" of FIG. 3 are the client stations 25-1 through 25-3, respectively, of FIG. 1.

Specifically, FIG. 2 shows a prior art sounding technique 100 for SU beamforming. In the sounding technique 100, the beamformer sends a "null data packet announcement" (NDPA) packet 102 to a beamformee (i.e., to an intended recipient of a beamformed transmission). Within a "short inter-frame space" (SIFS) after sending the NDPA packet 102, the beamformer sends a "null data packet" (NDP) 104, which serves as a sounding packet, to the beamformee. The beamformee processes the NDP 104 to calculate beamforming coefficients, and sends the coefficients back to the beamformer within feedback message 106. The beamformer then computes a steering vector to be used for beamformed transmissions to the beamformee.

FIG. 3 shows a prior art sounding technique 120 for MU beamforming. In the sounding technique 120, the beamformer sends an NDPA packet 122 to all beamformees (#1-#3, in the example scenario of FIG. 3). The NDPA packet 122 includes a station (STA) information field, and is followed within a SIFS by an NDP packet 124. The beamformee whose association identifier (AID) is included in the STA field of the NDPA packet 122 (i.e., "Beamformee #1" in the example scenario of FIG. 3) calculates beamforming coefficients based on the received NDP 124, and responds within a SIFS with a feedback message 126 that includes the calculated coefficients. The beamformer then polls subsequent stations (i.e., "Beamformee #2" then "Beamformee #3," in the example scenario of FIG. 3) with poll signals 130 and 132, and the beamformees respond with feedback messages 134 and 136, respectively, that include the calculated beamforming coefficients. The beamformer then uses the fed-back beamforming coefficients from all of the beamformees to compute a steering vector that is optimized to improve the reception of the MU data unit by all beamformees.

In alternative embodiments, the WLAN 10 of FIG. 1 uses another suitable technique, other than the example sounding techniques 100 and 120 of FIGS. 2 and 3, to obtain feedback information to be used for beamforming.

FIGS. 4-8 show example preamble formats used for different types of SU and MU data units, in either normal mode or low bandwidth mode, according to an embodiment. In various embodiments, the PHY processing unit 20 of AP 14, and/or the PHY processing unit 29 of client station 25-1, is/are configured to generate data units with preambles that conform to the example formats of FIGS. 4-8. For ease of explanation, each of the preamble formats of FIGS. 4-8 is described with reference to an embodiment and scenario in which the AP 14 transmits a data unit that uses the respective preamble format to the client station 25-1 (for an SU data unit), or to two or more of the client stations 25-1 through 25-4 (for an MU data unit). Moreover, in various embodiments and/or scenarios, a sounding technique such as the example technique 100 or 120 of FIG. 2 or 3 is used to beamform SU-BF and/or MU data units that use the preamble formats of FIGS. 4-8. Further, while particular numbers of OFDM symbols are shown for the various fields in the preambles of FIGS. 4-8, other embodiments include different numbers of OFDM symbols in some or all of the fields. In one embodiment, all "normal mode" preamble formats of FIGS. 4-8 correspond to data units transmitted over a 2 MHz or greater bandwidth, and all "low bandwidth mode" preamble formats in FIGS. 4-8 correspond to data units transmitted over a 1 MHz bandwidth.

Figure 4:
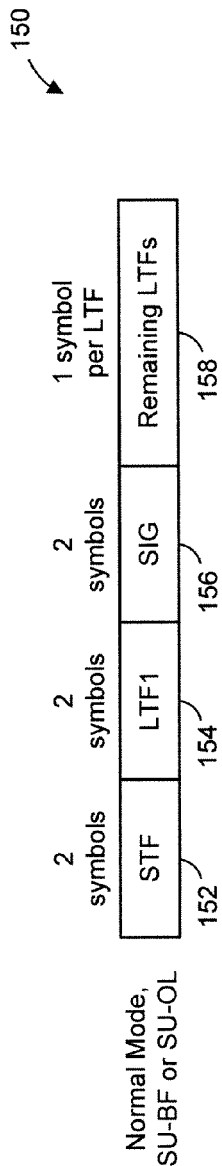
FIG. 4 is a diagram of an example preamble format used for normal mode, single-user (SU) data units, according to an embodiment.

Referring first to FIG. 4, the AP 14 uses the example preamble format 150 to generate a normal mode data unit, both for SU-BF data units and for non-beamformed, SU-OL data units, in an embodiment. In other embodiments, the AP 14 uses the example preamble format 150 to generate normal mode, SU-OL data units, but not SU-BF data units. The preamble format 150 includes a short training field (STF) 152, a first long training field (LTF1) 154 after the STF 152, a signal (SIG) field 156 after the LTF1 154, and any remaining LTFs 158 after the SIG field 156. In some embodiments and/or scenarios, SU data units using the preamble format 150 also include a data portion (not shown) immediately following the remaining LTFs 158. In an embodiment, the client station 25-1 detects a data unit utilizing the preamble format 150 during reception of the STF 152. Moreover, in an embodiment, the client station 25-1 sets an AGC level based on the STF 152, uses the LTF1 154 and any remaining LTF(s) 158 for channel estimation (e.g., one LTF per spatial stream, such that LTFs 158 are omitted for the case of one spatial stream), and uses information bits in the SIG field 156 to determine certain PHY parameters associated with the data unit that utilizes the preamble format 150 (e.g., a modulation and coding scheme used in a data portion of the data unit, a length or duration of the data portion, etc.).

In one embodiment and/or scenario where the preamble format 150 is used by a normal mode, SU-BF data unit, the entire preamble 150 is beamformed, in addition to any data portion following the preamble 150. That is, a beamforming steering matrix is applied to the entire data unit, starting with the beginning of the STF 152. By applying beamforming to the entire normal mode, SU-BF data unit, various problems may be avoided at the client station 25-1 when receiving the data unit. If the beamforming steering matrix were not applied to the STF 152, for example, the client station 25-1 would likely set a AGC level that is not optimized to the received signal level of the beamformed portion of the data unit. Moreover, if the beamforming steering matrix were not applied to the LTF1 154 and/or the remaining LTFs 158, the client station 25-1 would likely estimate channel parameters that only poorly reflect the channel corresponding to the beamformed portion of the data unit. As noted above, however, applying beamforming to the entire data unit (including all fields of the preamble format 150) can lead to a "hidden node" problem. In particular, devices within range of the AP 14 that happen to be at a location that is largely orthogonal to the direction of the beamformed transmission (e.g., any or all of client stations 25-2 through 25-4) may fail to decode information in the SIG field 156 that is indicative of the length or duration of the SU-BF data unit sent from the AP 14 to the client station 25-1. Thus, one or more other client stations may attempt to communicate with AP 14 while AP 14 is still transmitting to client station 25-1.

Figure 5:
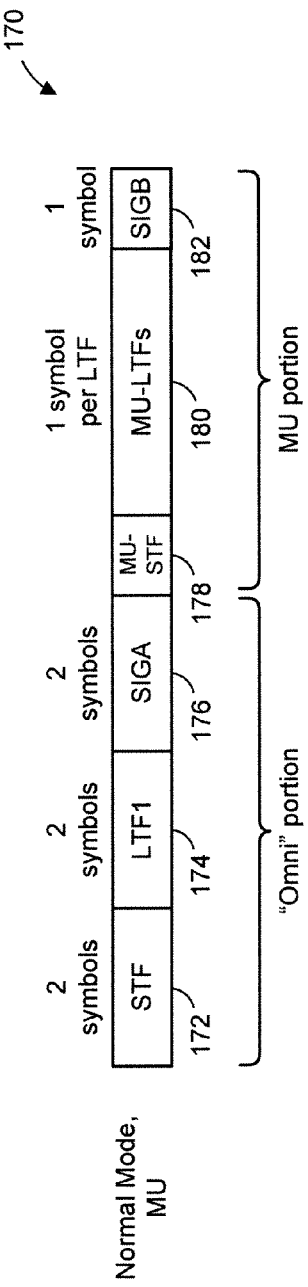
FIG. 5 is a diagram of an example preamble format used for normal mode, multi-user (MU) data units, according to an embodiment.

The AP 14 uses the example preamble format 170 of FIG. 5 to generate a normal mode, MU data unit, in an embodiment. The preamble format 170 includes an "omni" portion that is not beamformed, and an "MU portion" that is beamformed. The omni portion of the preamble format 170 includes an STF 172, an LTF1 174 after the STF 172, and a first SIG (SIGA) field 176 after the LTF1 174. The MU portion of the preamble format 170 includes a multi-user STF (MU-STF) 178, multi-user LTFs (MU-LTFs) 180 for channel estimation for all users, and a second SIG (SIGB) field 182 containing user-specific SIG field information. In some embodiments and/or scenarios, normal mode, MU data units that use the preamble format 170 also include a data portion (not shown), carrying data for all users, that immediately follows the SIGB field 182. Because the omni portion of the preamble 170 is not beamformed, each of the multiple users (e.g., any of client stations 25-1 through 25-4) can detect the data unit based on the STF 172, decode PHY information such as group identifier in the SIGA field 176, etc.

Figure 6:
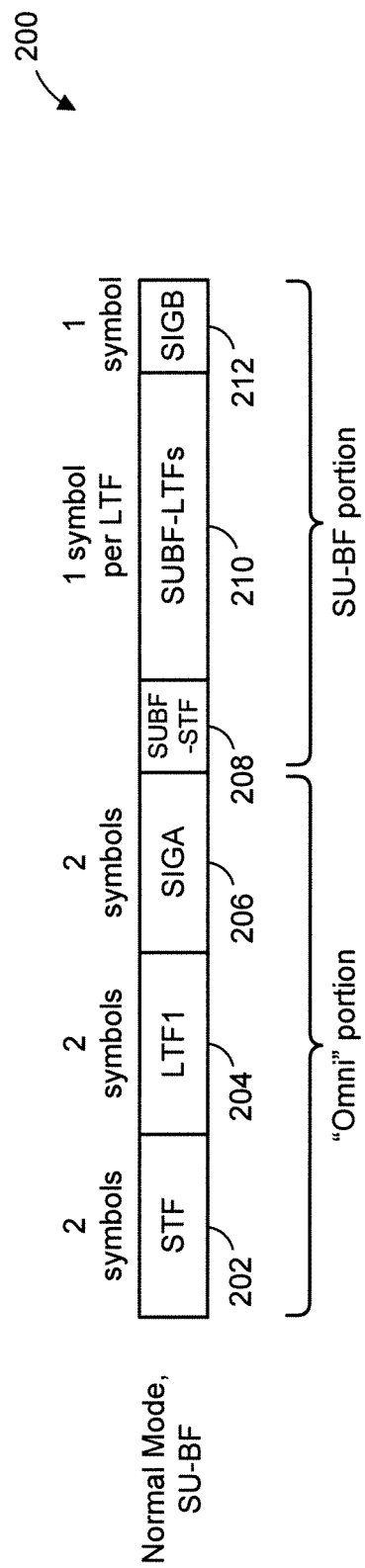
FIG. 6 is a diagram of an example preamble format used for normal mode, SU beamformed (SU-BF) data units, according to an embodiment.

As compared to the preamble format 150 of FIG. 4, the MU preamble format 170 is relatively long. Thus, preamble formats that do not include both omni and beamformed portions (e.g., preamble format 150) may be referred to herein as "short preamble" formats, while preamble formats that do include both omni and beamformed portions (e.g., preamble format 170) may be referred to herein as "long preamble" formats. In an embodiment, a "long preamble" format, similar to the preamble format 170 for normal mode, MU data units, is also used for normal mode, SU-BF data units. FIG. 6 is a diagram of one such long preamble format 200 that is used for normal mode, SU-BF data units, according to an embodiment. Similar to the long preamble format 170 of FIG. 5, the long preamble format 200 includes an omni portion that is not beamformed, and an "SU-BF portion" that is beamformed. The omni portion of the preamble format 200 includes an STF 202, an LTF1 204 after the STF 202, and a first SIG (SIGA) field 206 after the LTF1 204. The SU-BF portion of the preamble format 200 includes a beamformed STF (SUBF-STF) 208, beamformed LTFs (SUBF-LTFs) 210 for channel estimation for each spatial stream, and a beamformed second SIG (SIGB) field 212. In some embodiments, the SUBF-LTFs 210 include N LTFs, with a first of the N LTFs being repeated the same (or a similar) number of times as the LTF1 204 in the omni portion. In an embodiment, the first LTF of the SUBF-LTFs of an SU-BF data unit is the same as the first LTF (LTF1) of an MU data unit. In another embodiment, the first of the N LTFs in SUBF-LTFs 210 is only one OFDM symbol in length, and the field 212 is a duplicate of the first of the N LTFs, rather than a SIGB field as shown in FIG. 6 (so long as the SIGB field 212 is not needed to deliver information during SU-BF operation). By repeating the first LTF, channel estimation reliability may be increased. In some embodiments and/or scenarios, normal mode, SU-BF data units that use the long preamble format 200 also include a beamformed data portion that immediately follows the SIGB (or LTF) field 212.

Because the omni portion of the preamble 200 is not beamformed, other devices within range that are not intended recipients of the data unit using the long preamble format 200 can detect the data unit based on the STF 202, decode PHY information such as a length or duration of a data portion of the data unit in the SIGA field 206, etc. Therefore, communications using normal mode, SU-BF data units having the long preamble format 200 may suffer less from the hidden node problem than communications using normal mode, SU-BF data units having the short preamble format 150 of FIG. 4, for example.

In some embodiments, a transmitting device such as the AP 14 of FIG. 1 is configured to selectively generate both normal mode, SU-BF data units having the short preamble format 150 and normal mode, SU-BF data units having the long preamble format 200. In other embodiments, a transmitting device such as the AP 14 of FIG. 1 is configured to generate normal mode, SU-BF data units only using the long preamble format 200. In some of these latter embodiments, the transmitting device is configured to generate normal mode, SU-OL data units using the short preamble format 150, and normal mode, SU-BF data units using the long preamble format 200. In some embodiments and scenarios, at least one device (e.g., client station 25-1) is configured to generate normal mode, SU data units only using the short preamble format 150, and at least one other device (e.g., client station 25-2) in the same communication system (e.g., also in WLAN 10) is configured to generate normal mode, SU data units only using the long preamble format 200.

Figure 7:
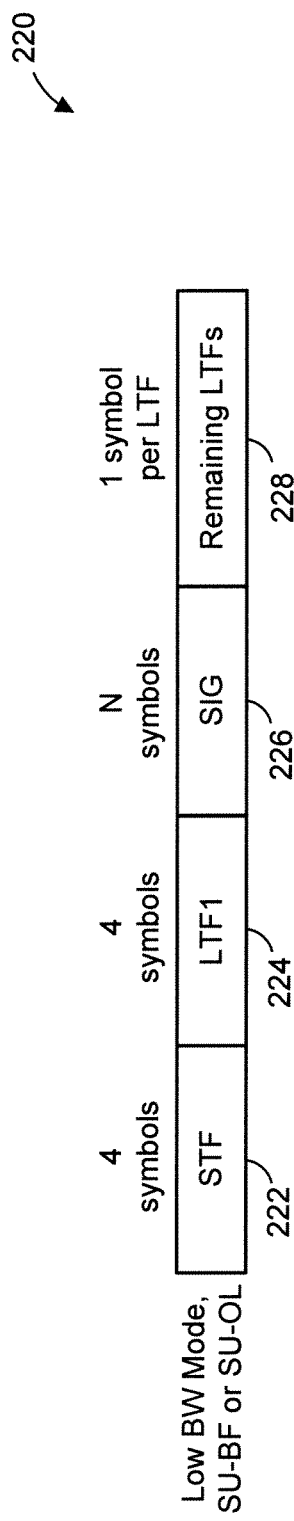
FIG. 7 is a diagram of an example preamble format used for low bandwidth mode, SU data units, according to an embodiment.
Figure 8:
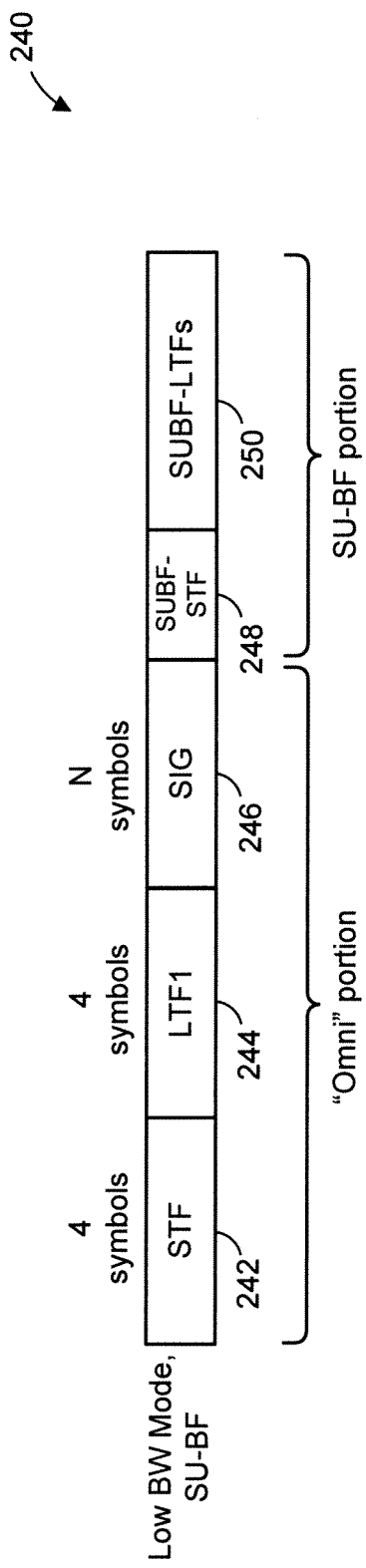
FIG. 8 is a diagram of an example preamble format used for low bandwidth mode, SU-BF data units, according to an embodiment.

FIGS. 7 and 8 show example short and long preamble formats for low bandwidth mode data units, according to an embodiment. The AP 14 uses the example short preamble format 220 of FIG. 7 to generate low bandwidth mode data units, both for SU-BF and for SU-OL operation, in an embodiment. In other embodiments, the AP 14 uses the short preamble format 220 to generate low bandwidth mode, SU-OL data units, but not low bandwidth mode, SU-BF data units. The short preamble format 220 includes an STF 222, an LTF1 224 after the STF 222, a SIG field 226 after the LTF1 224, and any remaining LTFs 228 after the SIG field 226. In some embodiments and/or scenarios, low bandwidth mode, SU data units using the short preamble format 220 also include a data portion (not shown) immediately following the remaining LTFs 228.

In one embodiment and/or scenario where the short preamble format 220 is used by a low bandwidth mode, SU-BF data unit, the preamble is beamformed, in addition to any data portion following the preamble. That is, a beamforming steering matrix is applied to the entire data unit, starting with the beginning of the STF 222, in a manner similar to that described above with reference to the short preamble format 150 of FIG. 4.

In an embodiment, a long preamble format is used for low bandwidth mode, SU-BF data units. FIG. 8 is a diagram of one such long preamble format 240. Similar to the long preamble format 200 of FIG. 6, the long preamble format 240 includes an omni portion that is not beamformed, and an "SU-BF portion" that is beamformed. The omni portion of the long preamble format 240 includes an STF 242, an LTF1 244 after the STF 242, and a SIG field 246 after the LTF1 244. The SU-BF portion of the long preamble format 240 includes a beamformed STF (SUBF-STF) 248, and beamformed LTFs (SUBF-LTFs) 250 for channel estimation for each spatial stream. In various embodiments, the SUBF-LTFs 250 include N LTFs, with each of the N LTFs having one, two, or four symbol repetitions. Because the omni portion of the long preamble format 240 is not beamformed, other devices within range that are not intended recipients of the data unit using the long preamble format 240 can detect the data unit based on the STF 242, decode PHY information such as a length of duration of a data portion in the SIG field 246, etc. Therefore, communications using low bandwidth mode, SU-BF data units that use the long preamble format 240 may suffer less from the hidden node problem than communications using low bandwidth mode, SU-BF data units that use the short preamble format 220 of FIG. 7, for example.

In some embodiments, a transmitting device such as the AP 14 of FIG. 1 is configured to selectively generate both low bandwidth mode, SU-BF data units that use the short preamble format 220 and low bandwidth mode, SU-BF data units that use the long preamble format 240. In other embodiments, a transmitting device such as the AP 14 of FIG. 1 is configured to generate low bandwidth mode, SU-BF data units only using the long preamble format 240. In some of these latter embodiments, the transmitting device is configured to generate low bandwidth mode, SU-OL data units using the short preamble format 220, and low bandwidth mode, SU-BF data units using the long preamble format 240. In some embodiments and scenarios, at least one device (e.g., client station 25-1) is configured to generate low bandwidth mode, SU-BF data units only using the short preamble format 220, and at least one other device (e.g., client station 25-2) is configured to generate low bandwidth mode, SU-BF data units only using the long preamble format 240.

In some embodiments where devices within a single communication system (e.g., within WLAN 10 of FIG. 1) can generate data units according to some or all of the various long and short, SU and MU preamble formats shown in FIGS. 4-8, devices receiving a data unit are configured to detect the preamble format utilized by the data unit. As used herein, a preamble "format" can refer to the arrangement and/or types of fields within the preamble (e.g., the arrangement of any STF(s), LTF(s), SIG field(s), etc.), and/or to the arrangement and types of subfields within one or more particular preamble fields (e.g., which PHY parameters are specified within a SIG field of the preamble, the location of the subfields corresponding to those PHY parameters, etc.).

Figure 9:
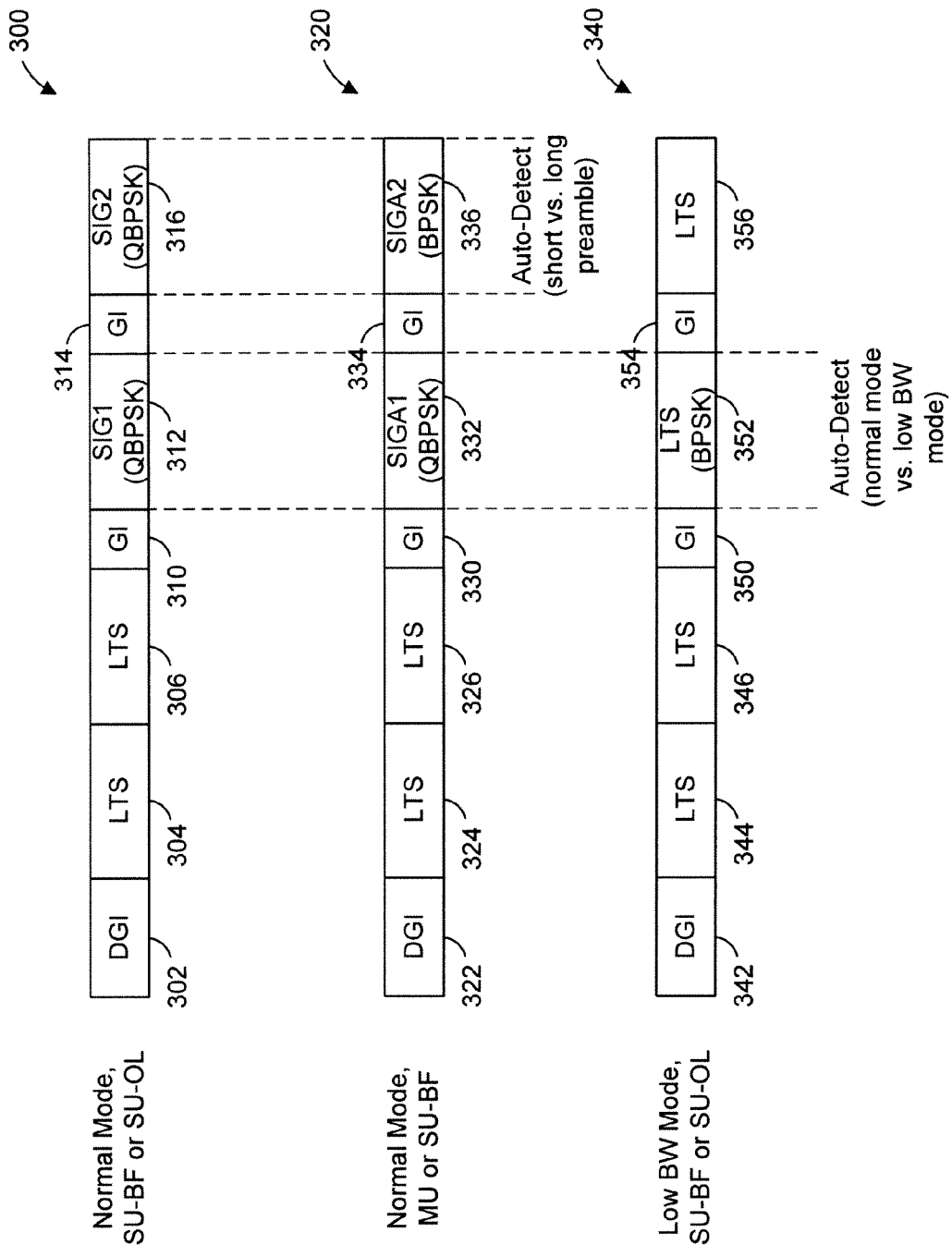
FIG. 9 is a diagram of corresponding preamble portions of an example normal mode, SU data unit, an example normal mode, MU or SU-BF data unit, and an example low bandwidth mode, SU data unit, according to an embodiment.

FIG. 9 illustrates an example technique for auto-detecting whether a data unit includes a short preamble format (e.g., similar to short preamble format 150 of FIG. 4) or a long preamble format (e.g., similar to long preamble format 170 of FIG. 5 or long preamble format 200 of FIG. 6), according to an embodiment. The example technique of FIG. 9 can also be used to auto-detect whether the data unit is a low bandwidth mode data unit or a normal mode data unit, which in some embodiments can also determine the preamble format (e.g., in embodiments where low bandwidth mode data units utilize only a short preamble format, and/or in embodiments where low bandwidth mode data units have a different number of OFDM symbols in certain fields as compared to normal mode data units, etc.). In FIG. 9, various preamble portions are shown starting from the beginning of the first LTF of the preamble. The beginning of the first LTF (after the STF) marks the first point at which the receiving device can achieve time alignment with respect the received data unit, in an embodiment. A first preamble portion 300 corresponds to a short preamble of a normal mode, SU (i.e., SU-OL or SU-BF) data unit, and includes a double guard interval (DGI) 302, a first OFDM symbol 304 of an LTF, a second OFDM symbol 306 of the LTF, a guard interval (GI) 310, a first OFDM symbol 312 of a SIG field, another GI 314, and a second OFDM symbol 316 of the SIG field, in an embodiment. A second preamble portion 320 corresponds to a long preamble of a normal mode, MU or SU-BF data unit, and includes a DGI 322, a first OFDM symbol 324 of an LTF, a second OFDM symbol 326 of the LTF, a GI 330, a first OFDM symbol 332 of a SIG field, another GI 334, and a second OFDM symbol 336 of the SIG field, in an embodiment. A third preamble portion 340 corresponds to a either a short or long preamble of a normal mode, SU (i.e., SU-BF or SU-OL) data unit, and includes a DGI 342, a first OFDM symbol 344 of an LTF, a second OFDM symbol 346 of the LTF, a GI 350, a third OFDM symbol 352 of the LTF, another GI 354, and a fourth OFDM symbol 356 of the LTF, in an embodiment. In various embodiments, the preamble portion 300 corresponds to the LTF1 154 and SIG field 156 of the short preamble format 150 of FIG. 4, the preamble portion 320 corresponds either to the LTF1 174 and SIGA field 176 of the long preamble format 170 of FIG. 5 (for an MU data unit), or to the LTF1 204 and SIGA field 206 of the long preamble format 200 of FIG. 6 (for an SU-BF data unit), and the preamble portion 340 corresponds either to the LTF1 224 and SIG field 226 of the short preamble format 220 of FIG. 7, or to the LTF1 244 and SIG field 246 of the long preamble format 240 of FIG. 8.

Figure 10:
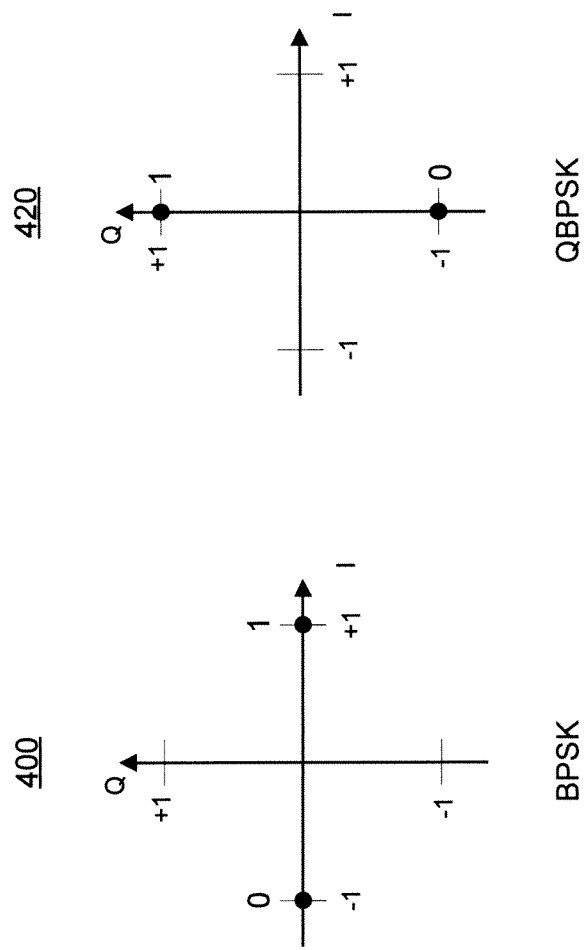
FIG. 10 is a diagram illustrating example modulation techniques used to modulate symbols within a data unit preamble, according to an embodiment.

As seen in FIG. 9, whether a data unit is a normal mode data unit or a low bandwidth mode data unit is indicated by the modulation type used for the third OFDM symbol from the start of the LTF. In particular, the OFDM symbol 312 (first SIG field symbol) of preamble portion 300, and the OFDM symbol 332 (first SIGA field symbol) of preamble portion 320, are modulated using quaternary binary phase shift key (QBPSK) modulation to indicate a normal mode data unit rather than a low bandwidth mode data unit. Conversely, the OFDM symbol 352 (third LTF symbol) of preamble portion 340 is modulated using binary phase shift key (BPSK) modulation to indicate a low bandwidth mode data unit rather than a normal mode data unit. FIG. 10 provides an illustration of a BPSK symbol constellation 400 and a QBPSK symbol constellation 420. As seen in FIG. 10, QBPSK modulation is identical to BPSK modulation, with the exception that the symbol constellation 420 of QBPSK is rotated by 90 degrees relative to the symbol constellation 400 of BPSK. Thus, in an embodiment, a receiver detects whether a received data unit is a normal mode data unit or low bandwidth mode data unit by detecting the rotation of the symbol constellation in the third OFDM symbol after the end of the STF. In various alternative embodiments, BPSK instead indicates normal mode and QBPSK instead indicates low bandwidth mode, the modulation of a different OFDM symbol (other than the third OFDM symbol following the STF) is used to indicate normal mode or low bandwidth mode, and/or a different symbol constellation (e.g., QPSK, 16-QAM, etc.) is rotated to indicate normal mode or low bandwidth mode.

Returning to FIG. 9, whether a normal mode data unit utilizes a short preamble format (e.g., similar to short preamble format 150 of FIG. 4) or a long preamble format (e.g., similar to long preamble format 170 of FIG. 5 or long preamble format 200 of FIG. 6) is indicated by the modulation type used for the fourth OFDM symbol from the start of the LTF. In particular, the OFDM symbol 316 (second SIG field symbol) of preamble portion 300 is modulated using QBPSK modulation to indicate a short preamble format rather than a long preamble format. Conversely, the OFDM symbol 336 (second SIGA symbol) of preamble portion 320 is modulated using BPSK modulation to indicate a long preamble format rather than a short preamble format. Thus, in an embodiment, a receiver detects whether a received data unit utilizes a short or a long preamble format by detecting the rotation of the symbol constellation in the fourth OFDM symbol after the end of the STF. In various alternative embodiments, BPSK instead indicates a short preamble format and QBPSK instead indicates a long preamble format, the modulation of a different OFDM symbol (other than the fourth OFDM symbol following the STF) is used to indicate whether a longer or shorter preamble format is used, and/or a different symbol constellation (e.g., QPSK, 16-QAM, etc.) is rotated to indicate whether a long or a short preamble format is used.

In some embodiments where low bandwidth mode data units may use either a short preamble format (e.g., similar to preamble format 220 of FIG. 7) or a long preamble format (e.g., similar to preamble format 240 of FIG. 7), symbol constellation rotations of OFDM symbols are also used by a receiver to detect whether a low bandwidth mode data unit uses the short or the long preamble format. In one embodiment, for example, if one or more of the OFDM symbols of the SIG field of a low bandwidth mode data unit (e.g., SIG field 226 of short preamble format 220 or SIG field 246 of long preamble format 240) are BPSK modulated, the receiver determines that the data unit uses a short preamble format, while QBPSK modulation instead indicates a long preamble format (or vice versa). In one embodiment where SU-OL low bandwidth mode data units only use a short preamble format, where SU-BF low bandwidth mode data units only use a long preamble format, and where MU low bandwidth mode data units are not permitted, determining whether a short or long preamble format is used by a low bandwidth mode data unit is equivalent to determining whether the data unit is an SU-OL data unit or an SU-BF data unit.

While FIG. 9 shows an example technique for auto-detecting whether a short or a long preamble format is used (in addition to auto-detecting whether the preamble belongs to a low bandwidth mode or a normal mode data unit), another mechanism is needed to allow a receiver to determine whether a data unit with a long preamble format is an SU-BF data unit or an MU data unit, in some embodiments. In some embodiments where both SU-BF data units and MU data units can utilize the long preamble format, for example, the auto-detections of FIG. 9 based on symbol constellation rotations do not sufficiently distinguish SU-BF data units from MU data units. For example, a receiver may still need to determine whether a data unit is an SU-BF data unit or an MU data unit in order to determine the types of subfields, and/or the number of bits per subfield, in a SIG field of the long preamble.

Accordingly, in one embodiment, a SIG field in the omni portion of each preamble that conforms to the long preamble format (e.g., SIGA field 176 of long preamble format 170 in FIG. 5, or SIGA field 206 of long preamble format 200 in FIG.

6) indicates whether the data unit is an SU-BF data unit or an MU data unit by way of a Group ID (GID) subfield in the SIG field. For example, a SIG field with a GID value in a particular subset of one or more GID values (e.g., 0 and 63, for a six bit GID subfield) indicates that the data unit is an SU-BF data unit, while all other GID values (e.g., 1 through 62) indicate that the data unit is an MU data unit, in an embodiment. In the latter instance, the GID subfield retains its "normal" function of indicating which stations are associated with the MU data unit, in an embodiment.

For one embodiment in which the GID subfield is used to distinguish SU-BF and MU data units, Table 1 shows an example arrangement/format of subfields and bits in a first SIG field of the preamble (e.g., SIG field) 56 of short preamble format 150 in FIG. 4, SIGA field 176 of long preamble format 170 in FIG. 5, or SIGA field 206 of long preamble format 200 in FIG. 6):

TABLE 1

| Subfield | SU with short preamble format (e.g., bits in SIG field 156) | MU with long preamble format (e.g., bits in SIGA field 176) | SU-BF with long preamble format (e.g., bits in SIGA field 206) |
|---|---|---|---|
| Length/Duration | 9 | 9 | 9 |
| MCS | 4 | 0 | 0 |
| BW | 2 | 2 | 2 |
| Aggregation | 1 | 0 | 0 |
| STBC | 1 | 1 | 1 |
| Coding | 2 | 5 | 5 (but only first 2 bits have meaning) |
| SGI | 1 | 1 | 1 |
| GID | 0 | 6 | 6 (e.g., set to 0 or 63) |
| Nsts | 2 | 8 | 8 (but only first 2 bits are non-zero) |
| PAID | 9 | 0 | 0 |
| Reserved | 7 | 6 | 6 |
| CRC | 4 | 4 | 4 |
| Tail | 6 | 6 | 6 |
| Total Bits | 48 | 48 | 48 |

The various SIG subfields shown in Table 1 are the same or similar to the like-named SIG subfields defined in the IEEE 802.11ac standard, in an embodiment. As seen in the example embodiment of Table 1, most subfields are identical between the SIG field of the MU long preamble format and the SIG field of the SU-BF long preamble format. In this embodiment, however, only a subset of bits in the coding and Nsts subfields are utilized for SU-BF operation. For example, in an embodiment, the coding subfield for SU-BF data units with the long preamble format use one bit as the LDPC additional bit and one bit as the LDPC/BCC indicator of the single user. As another example, in an embodiment, only the Nsts portion that would normally (for an MU data unit) correspond to a first of multiple users has a non-zero value, while the remaining Nsts values are all zero. In one embodiment, some of the "reserved" bits for the SU-BF, longer preamble format case are instead used for a PAID subfield. In the embodiment of Table 1, the MCS for an SU-BF data unit using the long preamble format is signaled in a later SIG field, such as the SIGB field 212 of the long preamble format 200 in FIG. 6.

In another embodiment where the GID subfield is used to indicate MU or SU-BF operation (as described above), the subfields and bits of the first SIG field (e.g., SIG field 156 of short preamble format 150 in FIG. 4, SIGA field 176 of long preamble format 170 in FIG. 5, or SIGA field 206 of long preamble format 200 in FIG. 6) are redefined and optimized for the SU-BF, long preamble format, as reflected in the example arrangement/format of Table 2:

TABLE 2

| Subfield | SU with short preamble format (e.g., bits in SIG field 156) | MU with long preamble format (e.g., bits in SIGA field 176) | SU-BF with long preamble format (e.g., bits in SIGA field 206) |
|---|---|---|---|
| Length/Duration | 9 | 9 | 9 |
| MCS | 4 | 0 | 4 |
| BW | 2 | 2 | 2 |
| Aggregation | 1 | 0 | 1 (or 0 if always aggregated) |
| STBC | 1 | 1 | 1 |
| Coding | 2 | 5 | 2 |
| SGI | 1 | 1 | 1 |
| GID | 0 | 6 | 6 (e.g., set to 0 or 63) |
| Nsts | 2 | 8 | 2 |
| PAID | 9 | 0 | N (e.g., 0 to 9) |
| Reserved | 7 | 6 | Depends on number of bits in PAID and aggregation fields |
| CRC | 4 | 4 | 4 |
| Tail | 6 | 6 | 6 |
| Total Bits | 48 | 48 | 48 |

The various SIG subfields shown in Table 2 are the same or similar to the like-named SIG subfields defined in the IEEE 802.11ac standard, in an embodiment. As seen in the example embodiment of Table 2, the coding and Nsts subfields are shortened for the SU-BF, long preamble format in order to avoid wasting the excess bits. At the same time, and unlike in Table 1, the SU-BF, long preamble format defines an MCS subfield for the first SIG field. Thus, in this embodiment, any later SIG fields (e.g., SIGB field 212 in FIG. 6) need not include the MCS. In some of these embodiments, the SU-BF data units using the long preamble format therefore do not include a second SIG field (e.g., SIGB field 212 is replaced with an LTF, or omitted, etc., in various embodiments).

In an alternative embodiment, a SIG field in the omni portion of each preamble conforming to the long preamble format (e.g., SIGA field 176 of long preamble format 170 in FIG. 5, or SIGA field 206 of long preamble format 200 in FIG. 6) includes an "MU/SU" bit that indicates whether the data is an SU-BF data unit or an MU data unit, rather than indicating SU or MU operation with a GID subfield. In some of these embodiments, the GID field is omitted from the SIG field of SU-BF data units that use the long preamble format (e.g., SIGA field 206 of long preamble format 200 in FIG. 6), as shown in the example arrangement/format of Table 3:

TABLE 3

| Subfield | SU with short preamble format (e.g., bits in SIG field 156) | MU with long preamble format (e.g., bits in SIGA field 176) | SU-BF with long preamble format (e.g., bits in SIGA field 206) |
|---|---|---|---|
| Length/Duration | 9 | 9 | 9 |
| MCS | 4 | 0 | 4 |
| BW | 2 | 2 | 2 |
| Aggregation | 1 | 0 | 1 (or 0 if always aggregated) |
| STBC | 1 | 1 | 1 |
| Coding | 2 | 5 | 2 |
| SGI | 1 | 1 | 1 |
| GID | 0 | 6 | 0 |
| Nsts | 2 | 8 | 2 |
| PAID | 9 | 0 | 9 |
| MU/SU | 0 | 1 (indicating "MU") | 1 (indicating "SU-BF") |
| Reserved | 7 | 6 | 6 (or 7 if no bits assigned to aggregation subfield) |
| CRC | 4 | 4 | 4 |
| Tail | 6 | 6 | 6 |
| Total Bits | 48 | 48 | 48 |

The various SIG subfields shown in Table 3 are the same or similar to the like-named SIG subfields defined in the IEEE 802.11ac standard, in an embodiment. As seen above, the SIG field format for SU-BF data units having the long preamble format is very similar to that in Table 2 (e.g., an MCS subfield is included). In Table 3, however, an MU/SU subfield is added to distinguish MU and SU-BF operation in data units having the long preamble format, and the GID subfield is omitted (in the SU-BF case) because it is no longer used to distinguish MU and SU-BF operation, and serves no other purpose for SU-BF operation. As with the example embodiment of Table 2, any later SIG fields in an SU-BF data unit using the long preamble format (e.g., the SIGB field 212 in FIG. 6) need not include the MCS. In some of these embodiments, the SU-BF data units using the long preamble format therefore do not include a second SIG field (e.g., SIGB field 212 is replaced with an LTF, or omitted, etc., in various embodiments).

In yet another embodiment, SU-BF operation, when using a long preamble format, is merely a subset of MU operation, for the special case in which only one user has data to be transmitted (i.e., where a non-zero number of space-time streams correspond to the single user, while no space-time streams correspond to any other users). In this embodiment, no "special" GID values are reserved to signify SU-BF operation. Rather, the single user is mapped to a GID just as any other users would be mapped to a GID in standard MU operation. Table 4 shows an example arrangement/format of subfields and bits in a first SIG field of a preamble (e.g., SIG field 156 of short preamble format 150 in FIG. 4, SIGA field 176 of long preamble format 170 in FIG. 5, or SIGA field 206 of long preamble format 200 in FIG. 6) for one such embodiment:

TABLE 4

| Subfield | SU with short preamble format (e.g., bits in SIG field 156) | MU with long preamble format (e.g., bits in SIGA field 176) | SU-BF with long preamble format (e.g., bits in SIGA field 206) |
|---|---|---|---|
| Length/Duration | 9 | 9 | 9 |
| MCS | 4 | 0 | 0 |
| BW | 2 | 2 | 2 |
| Aggregation | 1 | 0 | 0 |
| STBC | 1 | 1 | 1 |
| Coding | 2 | 5 | 5 |
| SGI | 1 | 1 | 1 |
| GID | 0 | 6 | 6 |
| Nsts | 2 | 8 | 8 |
| PAID | 9 | 0 | 0 |
| Reserved | 7 | 6 | 6 |
| CRC | 4 | 4 | 4 |
| Tail | 6 | 6 | 6 |
| Total Bits | 48 | 48 | 48 |

The various SIG subfields shown in Table 4 are the same or similar to the like-named SIG subfields defined in the IEEE 802.11ac standard, in an embodiment. As seen in the example embodiment of Table 4, the subfields of the first SIG field of MU data units having the long preamble format are identical to the subfields of the first SIG field of SU-BF data units having the long preamble format.

Figure 11:
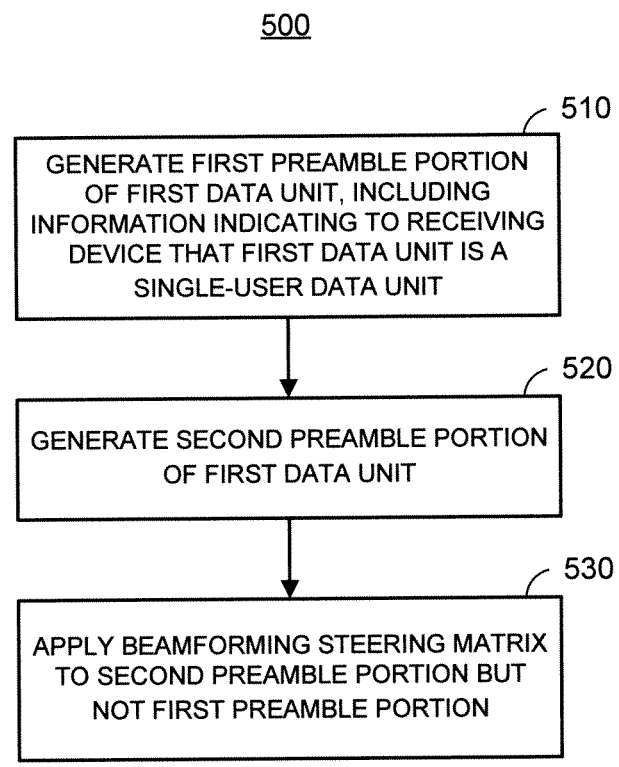
FIG. 11 is a flow diagram of an example method for generating a data unit, according to an embodiment.

FIG. 11 is a flow diagram of an example method 500 for generating a data unit, according to one embodiment and scenario. The method 500 is implemented by the network interface 16 of AP 14 of FIG. 1, in one embodiment and scenario.

At blocks 510 and 520, a preamble of a first data unit is generated according to a first format (e.g., a long preamble format). More specifically, a first preamble portion of the first data unit is generated at block 510, and a second preamble portion of the first data unit is generated at block 520. The first preamble portion generated at block 510 includes information indicating to a receiving device that the first data unit is an SU data unit. The second preamble portion generated at block 520 follows the first preamble portion generated at block 510.

In an embodiment, generating the first preamble portion at block 510 includes generating a SIG field that indicates PHY parameters associated with the first data unit to a receiving device. Moreover, in an embodiment, the generated SIG field includes the information (referenced above) that indicates to the receiving device that the first data unit is an SU data unit. For example, a bit in an MU/SU subfield of the SIG field indicates that the first data unit is an SU data unit, in one embodiment and scenario. In another example embodiment and scenario, a certain value or range of values in a Group ID (GID) subfield of the SIG field indicates that the first data unit is an SU data unit. In some embodiments, the SIG field also includes information indicating other PHY parameters of the first data unit, such as a modulation and coding scheme of a data portion of the first data unit.

In one embodiment, generating the first preamble portion at block 510 includes generating an STF, an LTF and a first SIG field similar to STF 202, LTF1 204, and SIGA field 206 of FIG. 6, respectively, and/or generating the second preamble portion at block 520 includes generating an STF, one or more additional LTFs, and a second SIG field similar to SUBF-STF 208, SUBF-LTFs 210, and SIGB field 212, respectively.

At block 530, a beamforming steering matrix is applied to the second preamble portion of the first data unit. The beamforming steering matrix is not applied, however, to the first preamble portion of the first data unit. Thus, the first preamble portion serves as an "omni" portion, which may be more easily detected by devices other than the intended recipient of the first data unit.

In some embodiments, the method 500 includes other blocks not seen in FIG. 11. In one embodiment, for example, the method 500 includes a first additional block in which a data portion of the first data unit is generated, where the data portion follows the second preamble portion generated at block 520, and a second additional block in which the beamforming steering matrix is also applied to the data portion of the first data unit.

As another example, in one embodiment and scenario, the method 500 includes additional blocks in which a preamble of a second data unit is generated according to a second format (e.g., short preamble format) different than the first format of the first data unit preamble. Generating the preamble of the second data unit according to the second format includes generating a first preamble portion of the second data unit and a second preamble portion of the data unit, in an embodiment. In one embodiment, the first preamble portion of the second data unit includes information indicating to a receiving device that the second data unit is an MU data unit, and the second preamble portion of the second data unit follows the first preamble portion of the second data unit. Further, in this embodiment and scenario, one or more beamforming steering matrices are applied to the second preamble portion of the second data unit, but not to the first preamble portion of the second data unit. In some embodiments, the first preamble portion of the first data unit includes a SIG field containing information indicating to a receiving device that the first data unit is an SU data unit, and the first preamble portion of the second data unit includes a SIG field containing information indicating to a receiving device that the second data unit is an MU data unit (e.g., an MU/SU bit, or a GID subfield, as described above).

Figure 12:
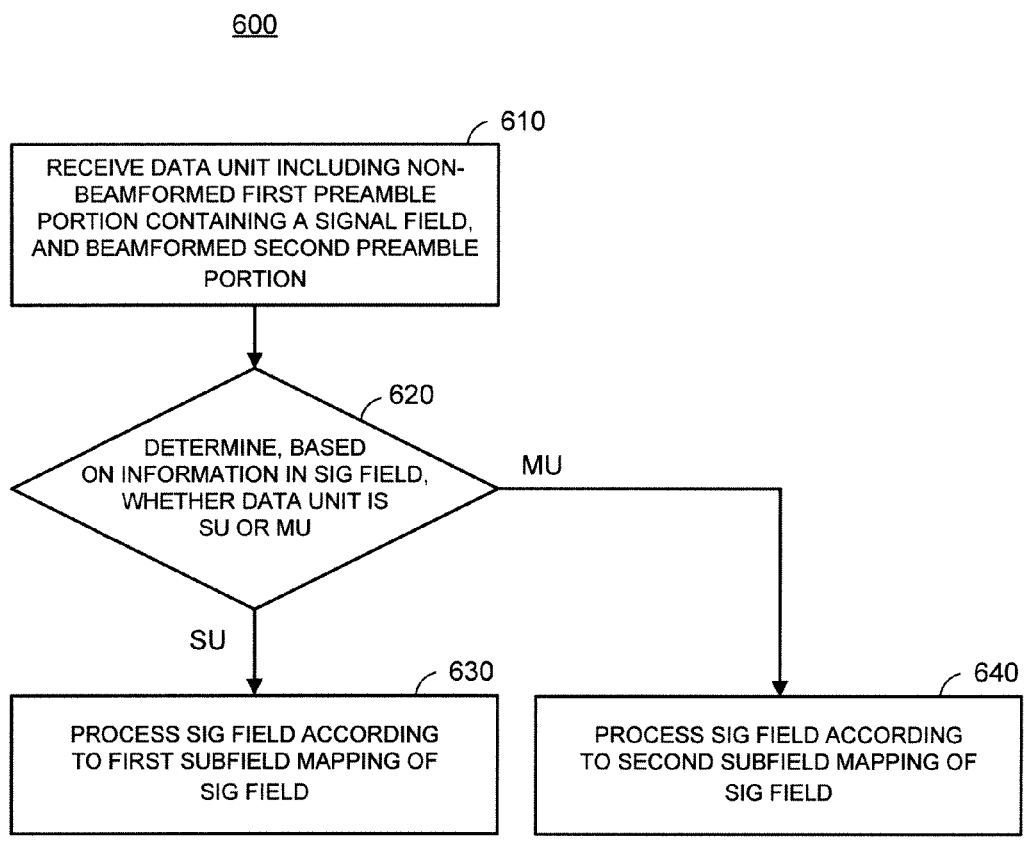
FIG. 12 is a flow diagram of an example method for receiving and processing a data unit, according to an embodiment.

FIG. 12 is a flow diagram of an example method 600 for receiving and processing a data unit, according to an embodiment. The method 600 is implemented by the network interface 27 of client station 25-1, in one embodiment and scenario. In one embodiment and scenario, the method 600 is used when receiving a data unit generated using the method 500 of FIG. 11. In some embodiments and scenarios, the method 600 is used when receiving a data unit having a preamble format similar to any of the long preamble format 170 of FIG. 5, the long preamble format 200 of FIG. 6, or the long preamble format 240 of FIG. 8.

At block 610, a data unit is received. The data unit includes a preamble having a first preamble portion that is not beamformed, and a second preamble portion that is beamformed. Moreover, the first preamble portion includes a SIG field indicating a plurality of PHY parameters associated with the received data unit.

At block 620, it is determined, based on information in the SIG field of the first preamble portion, whether the data unit received at block 610 is an SU data unit or an MU data unit. The determination at block 620 is made based on a bit of an MU/SU subfield (e.g., the first bit of the SIG field), in one embodiment. In an embodiment where SU-OL data units do not employ a long preamble format having an omni portion, determining whether the data unit is an SU data unit or an MU data unit is equivalent to determining whether the data unit is an SU-BF data unit or an MU data unit.

If it is determined at block 620 that the data unit received at block 610 is an SU data unit, flow proceeds to block 630. At block 630, the SIG field of the data unit is processed according to a first subfield mapping of the SIG field. In various embodiments, the first subfield mapping is the mapping shown in the "SU-BF with long preamble format" column of Table 1, Table 2, or Table 3, above. In one embodiment, the processing at block 630 includes determining a modulation and coding scheme (MCS) of the received data unit based on one or more information bits in an MCS subfield of the SIG field. In another embodiment, the processing at block 630 includes determining a partial association identifier (PAID) associated with the received data unit based on one or more information bits in a PAID subfield of the SIG field.

If it is instead determined at block 620 that the data unit received at block 610 is an MU data unit, flow proceeds to block 640. At block 640, the SIG field of the data unit is processed according to a second subfield mapping of the SIG field, different than the first subfield mapping. In various embodiments, the second subfield mapping is the mapping shown in the "MU with long preamble format" column of Table 1, Table 2, or Table 3, above. In one embodiment, the processing at block 640 includes determining a group identifier (GID) of the received data unit based on one or more information bits in a GID subfield of the SIG field.

In some embodiments, the method 600 includes other blocks not seen in FIG. 11. In one embodiment, for example, the method 600 includes an additional block in which a data portion of the data unit received at block 610 is processed, based on one or more PHY parameters indicated in one or more subfields of the SIG field. In some embodiments and scenarios, the method 600 is repeated for each data unit of a plurality of received data units.

FIG. 13 is a flow diagram of another example method 700 for receiving and processing a data unit, according to an embodiment. The method 700 is implemented by the network interface 27 of client station 25-1, in one embodiment and scenario. In one embodiment and scenario, the method 700 is used when receiving a data unit having a preamble format similar to any of the short preamble format 150 of FIG. 4, the long preamble format 170 of FIG. 5, the long preamble format 200 of FIG. 6, or the long preamble format 240 of FIG. 8.

At block 710, a data unit is received. The data unit includes a preamble having a first preamble portion, and a second preamble portion following the first preamble portion. The first preamble portion includes a SIG field indicating a plurality of PHY parameters associated with the received data unit.

At block 720, a symbol constellation rotation of one or more OFDM symbols in the first preamble portion is detected. In one embodiment where BPSK or QBPSK is utilized for a particular OFDM symbol (or set of symbols) in the first preamble portion, for example, the 0 degree or 90 degree rotation of the modulation is detected at block 720. In one embodiment, the OFDM symbol(s) for which the constellation rotation is detected is/are located in a SIG field of the first preamble portion.

At block 730, it is determined, based on the symbol constellation rotation detected at block 720, whether the preamble of the data unit received at block 710 conforms to a first format (e.g., a short preamble format). In one embodiment where BPSK or QBPSK is utilized, it is determined at block 730 that the preamble conforms to the first format if BPSK is utilized, and that the preamble does not conform to the first format if QBPSK is utilized, or vice versa. In an embodiment, the first format is a particular arrangement of fields within the preamble, such as the example preamble format 150 of FIG. 4.

If it is determined at block 730 that the preamble conforms to the first format, flow proceeds to block 740. At block 740, the second preamble portion of the data unit received at block 710 is processed according to the first format. In one embodiment, the first format is known to include at least one LTF at the beginning of the second preamble portion. Thus, in this embodiment, the processing at block 740 includes utilizing an LTF, located at a beginning of the second preamble portion of the data unit received at block 710, to estimate a channel response.

If it is instead determined at block 730 that the preamble does not conform to the first format, flow proceeds to block 750. At block 750, it is determined whether one or more information bits in the first preamble portion of the data unit received at block 710 indicate an SU data unit or an MU data unit. In an embodiment where SU-OL data units do not employ a long preamble format having an omni portion, determining whether the information bit(s) indicate an SU data unit or an MU data unit is equivalent to determining whether the information bit(s) indicate an SU-BF data unit or an MU data unit. In an embodiment, the information bit(s) used to make the determination at block 730 is/are included in a SIG field of the first preamble portion.

If it is determined at block 750 that the information bit(s) in the first preamble portion indicate an SU data unit, flow proceeds to block 760. At block 760, the second preamble portion of the data unit received at block 710 is processed according to a second format different than the first format. In one embodiment, the second format is known to be a preamble format used for SU, but not MU, data units (e.g., an SU-BF long preamble format). In one embodiment, the second format corresponds to a particular arrangement of fields within the preamble, such as the arrangement within the example long preamble format 200 of FIG. 6, for example. In one embodiment, the processing at block 760 includes both utilizing an STF at a beginning of the second preamble portion to set an AGC level of a receiver device implementing the method 700, and utilizing one or more LTFs of the second preamble portion to estimate one or more channel responses corresponding to one or more respective spatial streams associated with a single user (i.e., the user corresponding to the device implementing the method 700). In some of these embodiments, the second format is also known, by the receiving device, to include in the second preamble portion a duplicate of the first LTF of the second preamble portion. In the example preamble format 200 of FIG. 6, for example, the SIGB field 212 is instead a duplicate of the first LTF of SUBF-LTFs 210. In these embodiments, the processing at block 760 also includes utilizing the additional, duplicate LTF to help estimate the channel response of the spatial stream corresponding to the first LTF of the second preamble portion.

In one embodiment, the processing at block 760 is also based on a knowledge of the subfield types and locations in a SIG field of the first preamble portion, as specified by the second format. In various embodiments, for example, the second format specifies an arrangement of the SIG field of the first preamble portion as shown in the "SU-BF with long preamble format" column of Table 1, Table 2, or Table 3, above.

If it is instead determined at block 750 that the information bit(s) in the first preamble portion indicate an MU data unit, flow proceeds to block 770. At block 770, the second preamble portion of the data unit received at block 710 is processed according to a third format different than both the first format and the second format. In one embodiment, the third format is known to be a preamble format used for MU, but not SU, data units (e.g., an MU long preamble format). The third format corresponds to a particular arrangement of fields within the preamble, such as the arrangement of the example long preamble format 170 of FIG. 5, for example. In one embodiment, the processing at block 770 includes both utilizing an STF at a beginning of the second preamble portion to set an AGC level of a receiver device implementing the method 700, and utilizing one or more LTFs of the second preamble portion to estimate one or more channel responses associated with a single user (i.e., the user corresponding to the device implementing the method 700). Unlike the SU processing at block 760, however, the MU processing at block 770 is performed with knowledge that the LTFs in the second preamble portion include LTFs associated with multiple users (i.e., only a subset of the LTFs in the second preamble portion should be used for channel estimation by the receiving device). In an embodiment, it is known that the third format also includes a SIG field in the second preamble portion, which follows the LTFs of the second preamble portion and contains information bits that indicate one or more PHY parameters associated with the received data unit and the multiple users. Thus, in this embodiment, the processing at block 770 further includes decoding information bits in the SIG field of the second preamble portion.

In one embodiment, the processing at block 770 is also based on a knowledge of the subfield types and locations in a SIG field of the first preamble portion, as specified by the third format. In various embodiments, for example, the third format specifies an arrangement of the SIG field of the first preamble portion as shown in the "MU with long preamble format" column of Table 1, Table 2, or Table 3, above.

In some embodiments, the method 700 includes other blocks not seen in FIG. 13. In one embodiment, for example, the method 700 includes a first additional block in which a symbol constellation rotation of one or more additional OFDM symbols in the first preamble portion is detected, and a second additional block in which it is determined, based on the detected symbol constellation rotation of the additional OFDM symbol(s), whether the data unit corresponds to a first channel bandwidth (e.g., whether the data unit is a low bandwidth mode data unit). In one embodiment, for example, the symbol constellation rotation of a first OFDM symbol of a SIG field of the first preamble portion is detected at block 720, and the symbol constellation rotation of a second OFDM symbol of the SIG field of the first preamble portion is detected in an additional block, in an embodiment (e.g., as shown in the example preamble portions 300 and 320 of FIG. 9). In some embodiments and scenarios, the method 700 is repeated for each data unit of a plurality of received data units.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

Further aspects of the present invention relate to one or more of the following clauses.

In one embodiment, a method includes generating a preamble of a first data unit according to a first format. Generating the preamble of the first data unit according to the first format includes (i) generating a first preamble portion of the first data unit and (ii) generating a second preamble portion of the first data unit. The first preamble portion of the first data unit includes information indicating to a receiving device that the first data unit is a single-user data unit, and the second preamble portion of the first data unit follows the first preamble portion of the first data unit. The method also includes applying a beamforming steering matrix to the second preamble portion of the first data unit but not to the first preamble portion of the first data unit.

In other embodiments, the method includes one or more of the following features.

Generating the first preamble portion of the first data unit includes generating a first data unit SIG field that indicates PHY parameters associated with the first data unit to a receiving device, and the first data unit SIG field includes the information indicating to a receiving device that the first data unit is a single-user data unit.

Generating the first preamble portion of the first data unit further includes generating a first LTF before the first data unit SIG field, and generating a first STF before the first LTF, and generating the second preamble portion of the first data unit includes generating a second STF and a second LTF following the second STF.

Generating a data portion of the first data unit, where the data portion of the first data unit follows the second preamble portion of the first data unit, and applying the beamforming steering matrix to the data portion of the first data unit.

The first data unit SIG field further includes information indicating to a receiving device a modulation and coding scheme of the data portion of the first data unit.

Generating a preamble of a second data unit according to a second format different than the first format, where generating the preamble of the second data unit according to the second format includes (i) generating a first preamble portion of the second data unit, with the first preamble portion of the second data unit including information indicating to a receiving device that the second data unit is a multi-user data unit, and (ii) generating a second preamble portion of the second data unit, with the second preamble portion of the second data unit following the first preamble portion of the second data unit, and applying one or more beamforming steering matrices to the second preamble portion of the second data unit but not to the first preamble portion of the second data unit.

Generating the first preamble portion of the first data unit includes generating a first data unit SIG field that indicates PHY parameters associated with the first data unit to a receiving device, the first data unit SIG field includes the information indicating to a receiving device that the first data unit is a single-user data unit, generating the first preamble portion of the second data unit includes generating a second data unit SIG field that indicates PHY parameters associated with the second data unit to one or more receiving devices, and the second data unit SIG field includes the information indicating to a receiving device that the second data unit is a multi-user data unit.

In another embodiment, an apparatus includes a network interface. The network interface is configured to generate a preamble of a first data unit according to a first format, at least in part by (i) generating a first preamble portion of the first data unit and (ii) generating a second preamble portion of the first data unit. The first preamble portion of the first data unit includes information indicating to a receiving device that the first data unit is a single-user data unit, and the second preamble portion of the first data unit follows the first preamble portion of the first data unit. The network interface is also configured to apply a beamforming steering matrix to the second preamble portion of the first data unit but not to the first preamble portion of the first data unit.

In other embodiments, the apparatus includes one or more of the following features.

The network interface is configured to generate the first preamble portion of the first data unit at least in part by generating a first data unit SIG field that indicates PHY parameters associated with the first data unit to a receiving device, and the first data unit SIG field includes the information indicating to a receiving device that the first data unit is a single-user data unit.

The network interface is further configured to generate a data portion of the first data unit, wherein the data portion of the first data unit follows the second preamble portion of the first data unit, and apply the beamforming steering matrix to the data portion of the first data unit.

The first data unit SIG field further includes information indicating to a receiving device a modulation and coding scheme of the data portion of the first data unit.

The network interface is further configured to generate a preamble of a second data unit according to a second format different than the first format, at least in part by (i) generating a first preamble portion of the second data unit, where the first preamble portion of the second data unit includes information indicating to a receiving device that the second data unit is a multi-user data unit, and (ii) generating a second preamble portion of the second data unit, where the second preamble portion of the second data unit follows the first preamble portion of the second data unit, and to apply one or more beamforming steering matrices to the second preamble portion of the second data unit but not to the first preamble portion of the second data unit.

In another embodiment, a method includes receiving a plurality of data units. Each data unit of the plurality of data units includes a preamble having a first preamble portion that is not beamformed and a second preamble portion that is beamformed. The first preamble portion of each data unit includes a SIG field indicating a plurality of PHY parameters associated with the respective data unit. The method also includes determining, based on information in the SIG field of the first preamble portion of each data unit, whether the respective data unit is a single-user data unit or a multi-user data unit, and, when determining that the respective data unit is a single-user data unit, processing the SIG field of the respective data unit according to a first subfield mapping of the SIG field. The method also includes, when determining that the respective data unit is a multi-user data unit, processing the SIG field of the respective data unit according to a second subfield mapping of the SIG field. The second subfield mapping is different than the first subfield mapping.

In other embodiments, the method includes one or more of the following features.

Processing the SIG field of the respective data unit according to the first subfield mapping of the SIG field includes determining a modulation and coding scheme of the respective data unit based on one or more information bits in a SIG subfield of the SIG field of the respective data unit.

Processing the SIG field of the respective data unit according to the first subfield mapping of the SIG field includes determining a PAID associated with the respective data unit based on one or more information bits in a SIG subfield of the SIG field of the respective data unit.

Processing the SIG field of the respective data unit according to the second subfield mapping of the SIG field includes determining a GID of the respective data unit based on one or more information bits in a SIG subfield of the SIG field of the respective data unit.

In another embodiment, an apparatus includes a network interface configured to receive a plurality of data units. Each data unit of the plurality of data units includes a preamble having a first preamble portion that is not beamformed and a second preamble portion that is beamformed. The first preamble portion of each data unit includes a SIG field indicating a plurality of PHY parameters associated with the respective data unit. The network interface is also configured to determine, based on information in the SIG field of the first preamble portion of each data unit, whether the respective data unit is a single-user data unit or a multi-user data unit, and, when determining that the respective data unit is a single-user data unit, to process the SIG field of the respective data unit according to a first subfield mapping of the SIG field. The network interface is also configured to, when determining that the respective data unit is a multi-user data unit, process the SIG field of the respective data unit according to a second subfield mapping of the SIG field. The second subfield mapping is different than the first subfield mapping.

In other embodiments, the apparatus includes one or more of the following features.

The network interface is configured to process the SIG field of the respective data unit according to the first subfield mapping of the SIG field at least in part by determining a modulation and coding scheme of the respective data unit based on one or more information bits in a SIG subfield of the SIG field of the respective data unit.

The network interface is configured to process the SIG field of the respective data unit according to the first subfield mapping of the SIG field at least in part by determining a PAID associated with the respective data unit based on one or more information bits in a SIG subfield of the SIG field of the respective data unit.

The network interface is configured to process the SIG field of the respective data unit according to the second subfield mapping of the SIG field at least in part by determining a GID of the respective data unit based on one or more information bits in a SIG subfield of the SIG field of the respective data unit.

In another embodiment, a method includes receiving a plurality of data units each having a preamble. The preamble of each data unit of the plurality of data units includes (i) a first preamble portion, and (ii) a second preamble portion following the first preamble portion. The method also includes detecting a symbol constellation rotation of one or more OFDM symbols in the first preamble portion of each data unit, determining, based on each detected symbol constellation rotation, whether the preamble of the respective data unit conforms to a first format, and, when it is determined that the preamble of the respective data unit conforms to the first format, processing the second preamble portion of the respective data unit according to the first format. The method also includes, when it is determined that the preamble of the respective data unit does not conform to the first format, (i) determining whether one or more information bits in the first preamble portion of the respective data unit indicate a single-user data unit or a multi-user data unit, (ii) when it is determined that the one or more information bits in the first preamble portion of the respective data unit indicate a single-user data unit, processing the second preamble portion of the respective data unit according to a second format different than the first format, and (iii) when it is determined that the one or more information bits in the first preamble portion of the respective data unit indicate a multi-user data unit, processing the second preamble portion of the respective data unit according to a third format different than the first format and the second format.

In other embodiments, the method includes one or more of the following features.

Determining, based on each detected symbol constellation rotation, whether the preamble of the respective data unit conforms to a first format includes determining that the preamble of the respective data unit conforms to the first format when the detected symbol constellation rotation corresponds to one of (i) BPSK modulation or (ii) QBPSK modulation, and determining that the preamble of the respective data unit does not conform to the first format when the detected symbol constellation rotation corresponds to the other one of (i) BPSK modulation or (ii) QBPSK modulation.

Detecting a symbol constellation rotation of one or more OFDM symbols in the first preamble portion of each data unit includes detecting a symbol constellation rotation of one or more OFDM symbols in a SIG field of the first preamble portion of each data unit, and the SIG field of the first preamble portion of each data unit indicates a plurality of PHY parameters associated with the respective data unit.

Determining whether one or more information bits in the first preamble portion of the respective data unit indicates a single-user data unit or a multi-user data unit includes determining whether one or more information bits in the SIG field of the first preamble portion of the respective data unit indicates a single-user data unit or a multi-user data unit.

Processing the second preamble portion of the respective data unit according to the first format includes utilizing an LTF at a beginning of the second preamble portion of the respective data unit to estimate a channel response.

Processing the second preamble portion of the respective data unit according to the second format includes utilizing an STF at a beginning of the second preamble portion of the respective data unit to set an automatic gain control level of a receiver, and utilizing one or more LTFs of the second preamble portion of the respective data unit to estimate one or more channel responses corresponding to one or more respective spatial streams associated with a single user.

Processing the second preamble portion of the respective data unit according to the second format further includes utilizing an additional LTF of the second preamble portion of the respective data unit to estimate a channel response of a first spatial stream of the one or more respective spatial streams, where the additional LTF of the second preamble portion is identical to an initial LTF of the one or more LTFs of the second preamble portion, and where the additional LTF of the second preamble portion follows the one or more LTFs of the second preamble portion.

Processing the second preamble portion of the respective data unit according to the third format includes utilizing an STF at a beginning of the second preamble portion of the respective data unit to set an automatic gain control level of a receiver, and utilizing one or more LTFs of a plurality of LTFs in the second preamble portion of the respective data unit to estimate one or more channel responses, where the one or more channel responses correspond to one or more respective spatial streams associated with a single user, and where the plurality of LTFs in the second preamble portion includes LTFs associated with a plurality of users.

Processing the second preamble portion of the respective data unit according to the third format further includes decoding information bits in a SIG field of the second preamble portion, where the SIG field of the second preamble portion follows the plurality of LTFs of the second preamble portion, and where the information bits in the SIG field of the second preamble portion indicate one or more PHY parameters associated with (i) the respective data unit and (ii) the plurality of users.

Detecting a symbol constellation rotation of one or more additional OFDM symbols in the first preamble portion of each data unit, and determining, based on each detected symbol constellation rotation of the one or more additional OFDM symbols, whether the respective data unit corresponds to a first channel bandwidth.

Detecting a symbol constellation rotation of one or more OFDM symbols in the first preamble portion of each data unit includes detecting a symbol constellation rotation of a first OFDM symbol in a SIG field of the first preamble portion of each data unit, detecting a symbol constellation rotation of one or more additional OFDM symbols in the first preamble portion of each data unit includes detecting a symbol constellation rotation of a second OFDM symbol in the SIG field of the first preamble portion of each data unit, and the SIG field of the first preamble portion of each data unit indicates a plurality of PHY parameters associated with the respective data unit.

The first OFDM symbol in the SIG field of the first preamble portion follows the second OFDM symbol in the SIG field of the first preamble portion.

In another embodiment, an apparatus includes a network interface configured to receive a plurality of data units each having a preamble. The preamble of each data unit of the plurality of data units includes (i) a first preamble portion, and (ii) a second preamble portion following the first preamble portion. The network interface is further configured to detect a symbol constellation rotation of one or more OFDM symbols in the first preamble portion of each data unit, to determine, based on each detected symbol constellation rotation, whether the preamble of the respective data unit conforms to a first format, and, when it is determined that the preamble of the respective data unit conforms to the first format, to process the second preamble portion of the respective data unit according to the first format. The network interface is also configured, when it is determined that the preamble of the respective data unit does not conform to the first format, to (i) determine whether one or more information bits in the first preamble portion of the respective data unit indicate a single-user data unit or a multi-user data unit, (ii) when it is determined that the one or more information bits in the first preamble portion of the respective data unit indicate a single-user data unit, process the second preamble portion of the respective data unit according to a second format different than the first format, and (iii) when it is determined that the one or more information bits in the first preamble portion of the respective data unit indicate a multi-user data unit, process the second preamble portion of the respective data unit according to a third format different than the first format and the second format.

In other embodiments, the apparatus includes one or more of the following features.

The network interface is configured to determine, based on each detected symbol constellation rotation, whether the preamble of the respective data unit conforms to a first format at least in part by determining that the preamble of the respective data unit conforms to the first format when the detected symbol constellation rotation corresponds to one of (i) BPSK modulation or (ii) QBPSK modulation, and determining that the preamble of the respective data unit does not conform to the first format when the detected symbol constellation rotation corresponds to the other one of (i) BPSK modulation or (ii) QBPSK modulation.

The network interface is configured to detect a symbol constellation rotation of one or more OFDM symbols in the first preamble portion of each data unit at least in part by detecting a symbol constellation rotation of one or more OFDM symbols in a SIG field of the first preamble portion of each data unit; and the SIG field of the first preamble portion of each data unit indicates a plurality of PHY parameters associated with the respective data unit.

The network interface is configured to determine whether one or more information bits in the first preamble portion of the respective data unit indicate a single-user data unit or a multi-user data unit at least in part by determining whether one or more information bits in the SIG field of the first preamble portion of the respective data unit indicate a single-user data unit or a multi-user data unit.

The network interface is configured to process the second preamble portion of the respective data unit according to the first format at least in part by utilizing an LTF at a beginning of the second preamble portion of the respective data unit to estimate a channel response.

The network interface is configured to process the second preamble portion of the respective data unit according to the second format at least in part by utilizing an STF at a beginning of the second preamble portion of the respective data unit to set an automatic gain control level of a receiver, and utilizing one or more LTFs of the second preamble portion of the respective data unit to estimate one or more channel responses corresponding to one or more respective spatial streams associated with a single user.

The network interface is further configured to process the second preamble portion of the respective data unit according to the second format by utilizing an additional LTF of the second preamble portion of the respective data unit to estimate a channel response of a first spatial stream of the one or more respective spatial streams, where the additional LTF of the second preamble portion is identical to an initial LTF of the one or more LTFs of the second preamble portion, and where the additional LTF of the second preamble portion follows the one or more LTFs of the second preamble portion.

The network interface is configured to process the second preamble portion of the respective data unit according to the third format at least in part by utilizing an STF at a beginning of the second preamble portion of the respective data unit to set an automatic gain control level of a receiver, and utilizing one or more LTFs of a plurality of LTFs in the second preamble portion of the respective data unit to estimate one or more channel responses, where the one or more channel responses correspond to one or more respective spatial streams associated with a single user, and where the plurality of LTFs in the second preamble portion includes LTFs associated with a plurality of users.

The network interface is further configured to process the second preamble portion of the respective data unit according to the third format by decoding information bits in a SIG field of the second preamble portion, where the SIG field of the second preamble portion follows the plurality of LTFs of the second preamble portion, and where the information bits in the SIG field of the second preamble portion indicate one or more PHY parameters associated with (i) the respective data unit and (ii) the plurality of users.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method comprising:
    receiving a plurality of data units each having a preamble, wherein the preamble of each data unit of the plurality of data units includes (i) a first preamble portion, and (ii) a second preamble portion following the first preamble portion;
    detecting a symbol constellation rotation of one or more orthogonal frequency division multiplexing (OFDM) symbols in the first preamble portion of each data unit;
    determining, based on each detected symbol constellation rotation, whether the preamble of the respective data unit conforms to a first format;
    when it is determined that the preamble of the respective data unit conforms to the first format, processing the second preamble portion of the respective data unit according to the first format; and
    when it is determined that the preamble of the respective data unit does not conform to the first format,
        (i) determining whether one or more information bits in the first preamble portion of the respective data unit indicate a single-user data unit or a multi-user data unit,
        (ii) when it is determined that the one or more information bits in the first preamble portion of the respective data unit indicate a single-user data unit, processing the second preamble portion of the respective data unit according to a second format different than the first format, and
        (iii) when it is determined that the one or more information bits in the first preamble portion of the respective data unit indicate a multi-user data unit, processing the second preamble portion of the respective data unit according to a third format different than the first format and the second format.

2. A method according to claim 1, wherein determining, based on each detected symbol constellation rotation, whether the preamble of the respective data unit conforms to a first format includes:
    determining that the preamble of the respective data unit conforms to the first format when the detected symbol constellation rotation corresponds to one of (i) binary phase shift key (BPSK) modulation or (ii) quaternary binary phase shift key (QBPSK) modulation; and
    determining that the preamble of the respective data unit does not conform to the first format when the detected symbol constellation rotation corresponds to the other one of (i) BPSK modulation or (ii) QBPSK modulation.

3. A method according to claim 1, wherein:
    detecting a symbol constellation rotation of one or more OFDM symbols in the first preamble portion of each data unit includes detecting a symbol constellation rotation of one or more OFDM symbols in a signal (SIG) field of the first preamble portion of each data unit; and
    the SIG field of the first preamble portion of each data unit indicates a plurality of physical layer (PHY) parameters associated with the respective data unit.

4. A method according to claim 3, wherein determining whether one or more information bits in the first preamble portion of the respective data unit indicates a single-user data unit or a multi-user data unit includes:
    determining whether one or more information bits in the SIG field of the first preamble portion of the respective data unit indicates a single-user data unit or a multi-user data unit.

5. A method according to claim 1, wherein processing the second preamble portion of the respective data unit according to the first format includes:
    utilizing a long training field (LTF) at a beginning of the second preamble portion of the respective data unit to estimate a channel response.

6. A method according to claim 1, wherein processing the second preamble portion of the respective data unit according to the second format includes:
    utilizing a short training field (STF) at a beginning of the second preamble portion of the respective data unit to set an automatic gain control level of a receiver; and
    utilizing one or more long training fields (LTFs) of the second preamble portion of the respective data unit to estimate one or more channel responses corresponding to one or more respective spatial streams associated with a single user.

7. A method according to claim 6, wherein processing the second preamble portion of the respective data unit according to the second format further includes:
    utilizing an additional LTF of the second preamble portion of the respective data unit to estimate a channel response of a first spatial stream of the one or more respective spatial streams, wherein
        the additional LTF of the second preamble portion is identical to an initial LTF of the one or more LTFs of the second preamble portion, and
        the additional LTF of the second preamble portion follows the one or more LTFs of the second preamble portion.

8. A method according to claim 1, wherein processing the second preamble portion of the respective data unit according to the third format includes:
    utilizing a short training field (STF) at a beginning of the second preamble portion of the respective data unit to set an automatic gain control level of a receiver; and
    utilizing one or more long training fields (LTFs) of a plurality of LTFs in the second preamble portion of the respective data unit to estimate one or more channel responses, wherein
        the one or more channel responses correspond to one or more respective spatial streams associated with a single user, and
        the plurality of LTFs in the second preamble portion includes LTFs associated with a plurality of users.

9. A method according to claim 8, wherein processing the second preamble portion of the respective data unit according to the third format further includes:

decoding information bits in a signal (SIG) field of the second preamble portion, wherein
the SIG field of the second preamble portion follows the plurality of LTFs of the second preamble portion, and
the information bits in the SIG field of the second preamble portion indicate one or more physical layer (PHY) parameters associated with (i) the respective data unit and (ii) the plurality of users.

10. A method according to claim 1, further comprising:
detecting a symbol constellation rotation of one or more additional OFDM symbols in the first preamble portion of each data unit; and
determining, based on each detected symbol constellation rotation of the one or more additional OFDM symbols, whether the respective data unit corresponds to a first channel bandwidth.

11. A method according to claim 10, wherein:
detecting a symbol constellation rotation of one or more OFDM symbols in the first preamble portion of each data unit includes detecting a symbol constellation rotation of a first OFDM symbol in a signal (SIG) field of the first preamble portion of each data unit;
detecting a symbol constellation rotation of one or more additional OFDM symbols in the first preamble portion of each data unit includes detecting a symbol constellation rotation of a second OFDM symbol in the SIG field of the first preamble portion of each data unit; and
the SIG field of the first preamble portion of each data unit indicates a plurality of physical layer (PHY) parameters associated with the respective data unit.

12. A method according to claim 11, wherein the first OFDM symbol in the SIG field of the first preamble portion follows the second OFDM symbol in the SIG field of the first preamble portion.

13. An apparatus comprising:
a network interface configured to
receive a plurality of data units each having a preamble, wherein the preamble of each data unit of the plurality of data units includes (i) a first preamble portion, and (ii) a second preamble portion following the first preamble portion,
detect a symbol constellation rotation of one or more orthogonal frequency division multiplexing (OFDM) symbols in the first preamble portion of each data unit,
determine, based on each detected symbol constellation rotation, whether the preamble of the respective data unit conforms to a first format,
when it is determined that the preamble of the respective data unit conforms to the first format, process the second preamble portion of the respective data unit according to the first format, and
when it is determined that the preamble of the respective data unit does not conform to the first format,
(i) determine whether one or more information bits in the first preamble portion of the respective data unit indicate a single-user data unit or a multi-user data unit,
(ii) when it is determined that the one or more information bits in the first preamble portion of the respective data unit indicate a single-user data unit, process the second preamble portion of the respective data unit according to a second format different than the first format, and
(iii) when it is determined that the one or more information bits in the first preamble portion of the respective data unit indicate a multi-user data unit, process the second preamble portion of the respective data unit according to a third format different than the first format and the second format.

14. An apparatus according to claim 13, wherein the network interface is configured to determine, based on each detected symbol constellation rotation, whether the preamble of the respective data unit conforms to a first format at least in part by:
determining that the preamble of the respective data unit conforms to the first format when the detected symbol constellation rotation corresponds to one of (i) binary phase shift key (BPSK) modulation or (ii) quaternary binary phase shift key (QBPSK) modulation; and
determining that the preamble of the respective data unit does not conform to the first format when the detected symbol constellation rotation corresponds to the other one of (i) BPSK modulation or (ii) QBPSK modulation.

15. An apparatus according to claim 13, wherein:
the network interface is configured to detect a symbol constellation rotation of one or more OFDM symbols in the first preamble portion of each data unit at least in part by detecting a symbol constellation rotation of one or more OFDM symbols in a signal (SIG) field of the first preamble portion of each data unit; and
the SIG field of the first preamble portion of each data unit indicates a plurality of physical layer (PHY) parameters associated with the respective data unit.

16. An apparatus according to claim 15, wherein the network interface is configured to determine whether one or more information bits in the first preamble portion of the respective data unit indicate a single-user data unit or a multi-user data unit at least in part by:
determining whether one or more information bits in the SIG field of the first preamble portion of the respective data unit indicate a single-user data unit or a multi-user data unit.

17. An apparatus according to claim 13, wherein the network interface is configured to process the second preamble portion of the respective data unit according to the first format at least in part by:
utilizing a long training field (LTF) at a beginning of the second preamble portion of the respective data unit to estimate a channel response.

18. An apparatus according to claim 13, wherein the network interface is configured to process the second preamble portion of the respective data unit according to the second format at least in part by:
utilizing a short training field (STF) at a beginning of the second preamble portion of the respective data unit to set an automatic gain control level of a receiver; and
utilizing one or more long training fields (LTFs) of the second preamble portion of the respective data unit to estimate one or more channel responses corresponding to one or more respective spatial streams associated with a single user.

19. An apparatus according to claim 18, wherein the network interface is further configured to process the second preamble portion of the respective data unit according to the second format by:
utilizing an additional LTF of the second preamble portion of the respective data unit to estimate a channel response of a first spatial stream of the one or more respective spatial streams, wherein
the additional LTF of the second preamble portion is identical to an initial LTF of the one or more LTFs of the second preamble portion, and the additional LTF of the second preamble portion follows the one or more LTFs of the second preamble portion.

20. An apparatus according to claim 13, wherein the network interface is configured to process the second preamble portion of the respective data unit according to the third format at least in part by:
  utilizing a short training field (STF) at a beginning of the second preamble portion of the respective data unit to set an automatic gain control level of a receiver; and
  utilizing one or more long training fields (LTFs) of a plurality of LTFs in the second preamble portion of the respective data unit to estimate one or more channel responses, wherein
    the one or more channel responses correspond to one or more respective spatial streams associated with a single user, and
    the plurality of LTFs in the second preamble portion includes LTFs associated with a plurality of users.

21. An apparatus according to claim 20, wherein the network interface is further configured to process the second preamble portion of the respective data unit according to the third format by:
  decoding information bits in a signal (SIG) field of the second preamble portion, wherein
    the SIG field of the second preamble portion follows the plurality of LTFs of the second preamble portion, and
    the information bits in the SIG field of the second preamble portion indicate one or more physical layer (PHY) parameters associated with (i) the respective data unit and (ii) the plurality of users.

* * * * *